United States Patent
Seo et al.

(10) Patent No.: US 11,907,516 B2
(45) Date of Patent: Feb. 20, 2024

(54) ELECTRONIC DEVICE, METHOD, AND NON-TRANSITORY COMPUTER READABLE STORAGE MEDIUM FOR IDENTIFYING SET OF INFORMATION ACCORDING TO CHANGE IN SIZE OF DISPLAY AREA OF FLEXIBLE DISPLAY

(71) Applicant: SAMSUNG ELECTRONICS CO., LTD., Suwon-si (KR)

(72) Inventors: Kuenyoung Seo, Suwon-si (KR); Semin Park, Suwon-si (KR); Kyunghoon Han, Suwon-si (KR); Haemi Yoon, Suwon-si (KR); Hyungjoo Nam, Suwon-si (KR); Sumi Shim, Suwon-si (KR); Eunhye Lee, Suwon-si (KR); Minji Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/099,403

(22) Filed: Jan. 20, 2023

(65) Prior Publication Data
US 2023/0333722 A1    Oct. 19, 2023

Related U.S. Application Data

(63) Continuation of application No. PCT/KR2023/000567, filed on Jan. 12, 2023.

(30) Foreign Application Priority Data

Apr. 16, 2022  (KR) .................... 10-2022-0047227
Jun. 15, 2022  (KR) .................... 10-2022-0073124

(51) Int. Cl.
*G06F 3/048*       (2013.01)
*G06F 3/04845*     (2022.01)
(Continued)

(52) U.S. Cl.
CPC ........ *G06F 3/04845* (2013.01); *G06F 1/1652* (2013.01); *G06F 3/04883* (2013.01)

(58) Field of Classification Search
CPC . G06F 3/04845; G06F 1/1652; G06F 3/04883
See application file for complete search history.

(56) References Cited

U.S. PATENT DOCUMENTS 9,990,125 B2 *   6/2018  Jung ..................... G06F 3/0482
10,379,720 B2 *  8/2019  Ryu ..................... G06F 3/04845
(Continued)

FOREIGN PATENT DOCUMENTS

KR        101659032 B1    9/2016
KR    10-2017-0058816    5/2017
(Continued)

OTHER PUBLICATIONS

International Search Report dated Apr. 10, 2023 for PCT/KR2023/000567.
PCT Written Opinion dated Apr. 10, 2023 for PCT/KR2023/000567.

*Primary Examiner* — Linh K Pham
(74) *Attorney, Agent, or Firm* — NIXON & VANDERHYE P.C.

(57) ABSTRACT

An electronic device include a housing, a flexible display capable of being slid into the housing and being slid out of the housing, a memory configured to store instructions, and a processor operably coupled with the flexible display. The processor is configured to, when the instructions are executed, display a user interface including sets of information in a display area of the flexible display exposed out of the housing. The processor is configured to, when the instructions are executed, receive a user input for changing size of the display area from first size to second size smaller than the first size, while displaying the user interface including the sets of the information.

20 Claims, 24 Drawing Sheets

(51) Int. Cl.
*G06F 1/16* (2006.01)
*G06F 3/04883* (2022.01)

(56) References Cited

U.S. PATENT DOCUMENTS

| | | | |
|---|---|---|---|
| 10,678,428 | B2 | 6/2020 | Kim et al. |
| 10,977,771 | B2 | 4/2021 | Jeong et al. |
| 11,003,326 | B2* | 5/2021 | Son ................... G06F 3/0483 |
| 11,169,697 | B2 | 11/2021 | Lee et al. |
| 11,385,684 | B2 | 7/2022 | Kwon |
| 11,416,042 | B2 | 8/2022 | Kang et al. |
| 2010/0088634 | A1* | 4/2010 | Tsuruta ............... G06F 3/0481 715/788 |
| 2013/0127917 | A1* | 5/2013 | Kwack ................ G06F 1/1652 345/660 |
| 2015/0220119 | A1* | 8/2015 | Seo ......................... G09G 5/37 345/173 |
| 2016/0246763 | A1* | 8/2016 | Higuchi ................ G09G 5/14 |
| 2017/0140504 | A1* | 5/2017 | Jeong ................. G06F 1/1677 |
| 2017/0147189 | A1* | 5/2017 | Ryu ................... G06F 3/04886 |
| 2017/0154609 | A1* | 6/2017 | Yoon ................... G06F 3/0483 |
| 2017/0185215 | A1* | 6/2017 | Kim ................... G06F 1/1694 |
| 2017/0186132 | A1* | 6/2017 | Lee ................... G06F 1/1694 |
| 2018/0107758 | A1* | 4/2018 | Ha ..................... G06F 16/9577 |
| 2018/0175975 | A1* | 6/2018 | Um ........................ H04L 1/18 |
| 2018/0232120 | A1* | 8/2018 | Son ..................... G06F 3/0485 |
| 2018/0341142 | A1* | 11/2018 | Choi .................... H10K 59/122 |
| 2018/0374452 | A1* | 12/2018 | Choi ................... G06F 3/04886 |
| 2019/0033984 | A1* | 1/2019 | Seo .................... G06F 3/0486 |
| 2021/0096732 | A1* | 4/2021 | Sonnino .............. G06F 3/04842 |
| 2021/0201726 | A1* | 7/2021 | Kim ...................... G09G 3/035 |
| 2021/0295803 | A1* | 9/2021 | Shim .................... G06F 1/1652 |
| 2021/0303027 | A1* | 9/2021 | Kim .................... G06F 1/1686 |
| 2021/0350767 | A1* | 11/2021 | Lee ................... G06Q 30/0267 |
| 2022/0038564 | A1* | 2/2022 | Li ...................... G06F 1/1652 |
| 2022/0066510 | A1* | 3/2022 | Cha .................... G06F 1/1652 |
| 2022/0148473 | A1* | 5/2022 | Kim .................... G06F 1/1652 |
| 2022/0279058 | A1* | 9/2022 | Song ................... H04M 1/0268 |
| 2023/0029563 | A1* | 2/2023 | Choi .................... G06F 1/1624 |
| 2023/0040472 | A1* | 2/2023 | Kim .................... G06F 1/1624 |
| 2023/0102237 | A1 | 3/2023 | Jung et al. |
| 2023/0120972 | A1* | 4/2023 | Acar ...................... G01D 5/20 324/207.16 |

FOREIGN PATENT DOCUMENTS

| | | |
|---|---|---|
| KR | 10-2017-0060519 | 6/2017 |
| KR | 10-2017-0083404 | 7/2017 |
| KR | 20180135877 A | 12/2018 |
| KR | 102066575 B1 | 1/2020 |
| KR | 10-2020-0093346 | 8/2020 |
| KR | 102206948 B1 | 1/2021 |
| KR | 10-2256681 | 5/2021 |
| KR | 20210156983 A | 12/2021 |
| WO | WO2018209152 A1 | 11/2018 |

* cited by examiner

ELECTRONIC DEVICE, METHOD, AND NON-TRANSITORY COMPUTER READABLE STORAGE MEDIUM FOR IDENTIFYING SET OF INFORMATION ACCORDING TO CHANGE IN SIZE OF DISPLAY AREA OF FLEXIBLE DISPLAY

CROSS-REFERENCE TO RELATED APPLICATIONS

This application is a continuation of International Application No. PCT/KR2023/000567 designating the United States, filed on Jan. 12, 2023, in the Korean Intellectual Property Receiving Office and claiming priority to Korean Patent Application No. 10-2022-0047227, filed on Apr. 16, 2022, in the Korean Intellectual Property Office, and to Korean Patent Application No. 10-2022-0073124, filed on Jun. 15, 2022, in the Korean Intellectual Property Office, the disclosures of all of which are incorporated by reference herein in their entireties.

BACKGROUND

Field

The disclosure relates to an electronic device, a method, and a non-transitory computer readable storage medium for identifying a set of information according to change in size of a display area of a flexible display.

Description of Related Art

An electronic device including a flexible display such as a rollable display may provide a state in which a part of the flexible display is slid into a housing of the electronic device and a state in which the part of the flexible display is exposed outside the housing. The electronic device may provide a relatively large display area while having a relatively compact structure through providing the states.

SUMMARY

According to an example embodiment, an electronic device may comprise: a housing, a flexible display capable of being slid into the housing and being slid out of the housing, a memory configured to store instructions, and a processor operably coupled with the flexible display. The processor may be configured to, when the instructions are executed, display a user interface including sets of information in a display area of the flexible display exposed out of the housing. The processor may be configured to, when the instructions are executed, receive a user input for changing size of the display area from first size to second size smaller than the first size, while displaying the user interface including the sets of the information. The processor may be configured to, when the instructions are executed, identify a set of first information among the sets, based on at least one of context information of the electronic device or context information of a user of the electronic device, in response to the user input. The processor may be configured to, when the instructions are executed, display the user interface including the set of the first information and a set of second information that is different from the sets and is associated with the set of the first information in the display area with the second size changed from the first size and cease to display remaining sets among the sets in the user interface.

According to an example embodiment, a method for operating an electronic device including a housing and a flexible display capable of being slid into the housing and being slid out of the housing may comprise displaying a user interface including sets of information in a display area of the flexible display exposed out of the housing. The method may comprise receiving a user input for changing size of the display area from first size to second size smaller than the first size, while displaying the user interface including the sets of the information. The method may comprise identifying a set of first information among the sets, based on at least one of context information of the electronic device or context information of a user of the electronic device, in response to the user input. The method may comprise displaying the user interface including the set of the first information and a set of second information that is different from the sets and is associated with the set of the first information in the display area with the second size changed from the first size and ceasing to display remaining sets among the sets in the user interface.

According to an example embodiment, a non-transitory computer-readable storage medium may store one or more programs, the one or more programs comprising instructions which, when executed by a processor of an electronic device including a housing and a flexible display capable of being slid into the housing and being slid out of the housing, cause the electronic device to display a user interface including sets of information in a display area of the flexible display exposed out of the housing. The one or more programs may comprise instructions which, when executed by the processor of the electronic device, cause the electronic device to receive a user input for changing size of the display area from first size to second size smaller than the first size, while displaying the user interface including the sets of the information. The one or more programs may comprise instructions which, when executed by the processor of the electronic device, cause the electronic device to identify a set of first information among the sets, based on at least one of context information of the electronic device or context information of a user of the electronic device, in response to the user input. The one or more programs may comprise instructions which, when executed by the processor of the electronic device, cause the electronic device to display the user interface including the set of the first information and a set of second information that is different from the sets and is associated with the set of the first information in the display area with the second size changed from the first size and cease to display remaining sets among the sets in the user interface.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An electronic device may include a flexible display that is at least partially sliding into a housing of the electronic device or at least partially slid out of the housing. The size of the display area of the flexible display exposed to the outside of the housing may be changed according to the sliding-in or the sliding-out. For example, the size of the display area may be changed from first size to second size smaller than the first size according to the sliding-in or the sliding-out. For example, since the second size is smaller than the first size, a method for identifying a set to be displayed within the display area having the second size may be required, among sets of information displayed in the display area having the first size.

Figure 1:
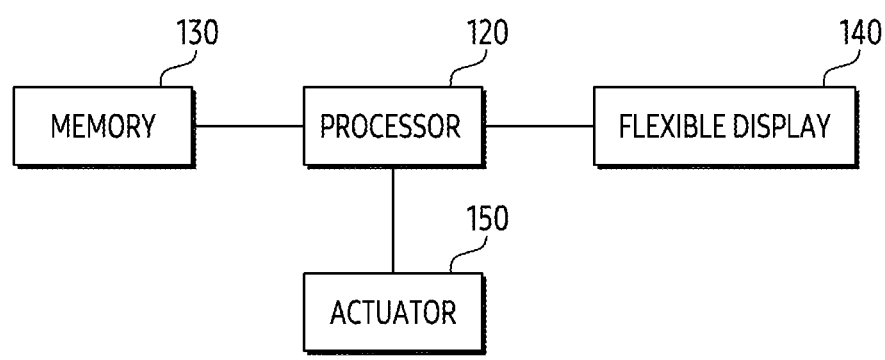
FIG. 1 illustrates exemplary components of an electronic device.

FIG. 1 illustrates exemplary components of an electronic device.

Figure 13A:
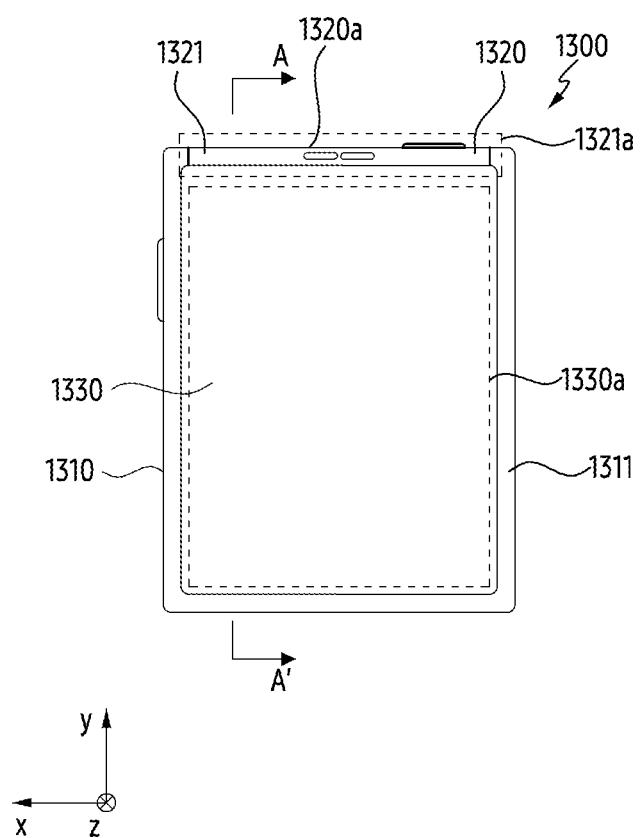
FIG. 13A is a front view of a first state of an electronic device according to an embodiment.
Figure 13B:
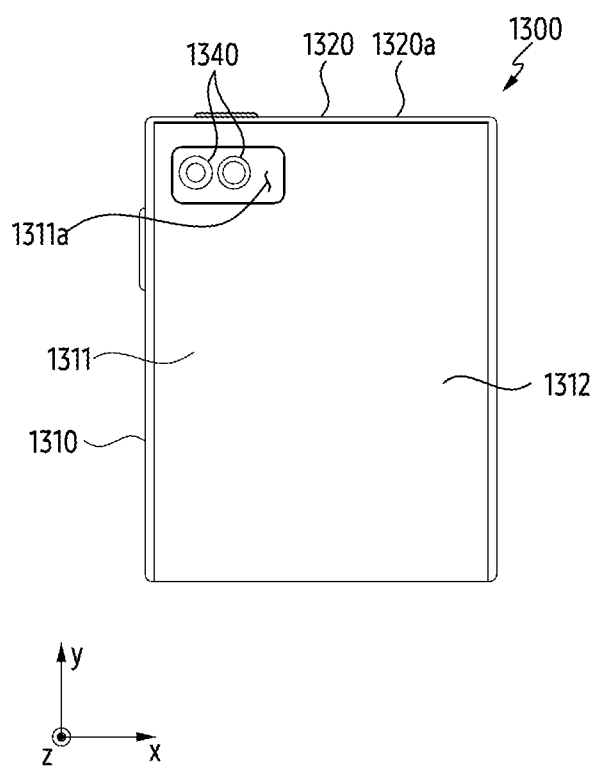
FIG. 13B is a rear view of a first state of an electronic device according to an embodiment.
Figure 13C:
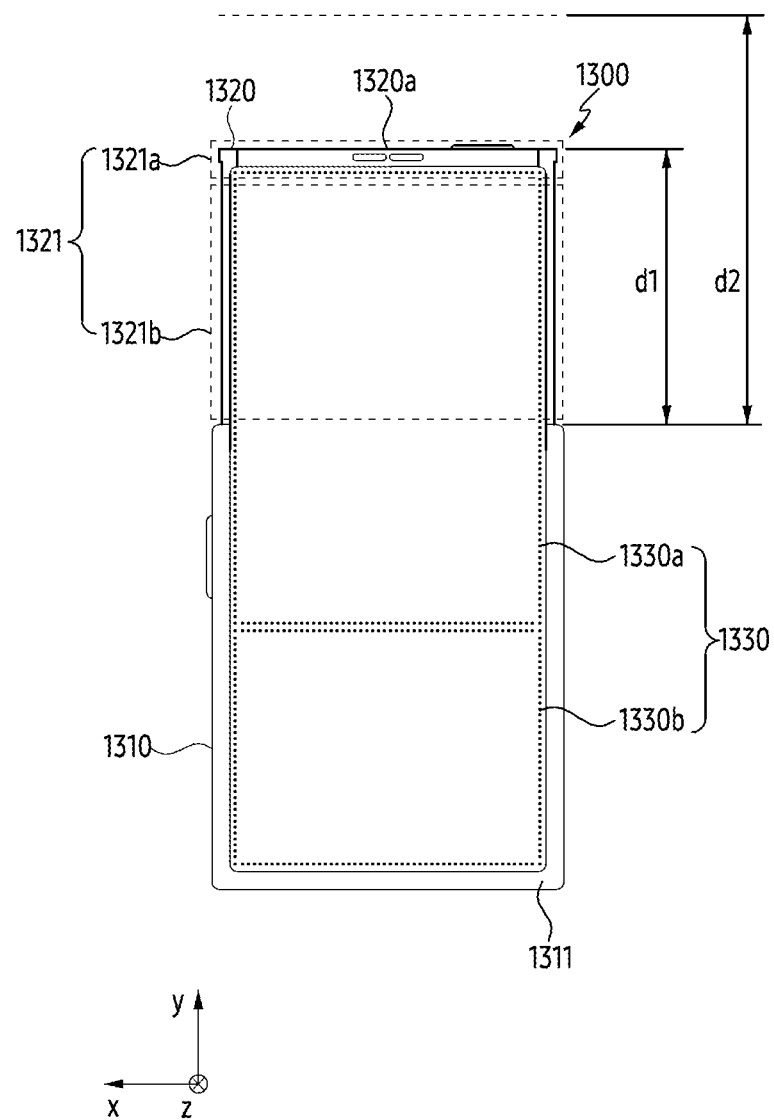
FIG. 13C is a front view of a second state of an electronic device according to an embodiment.
Figure 13D:
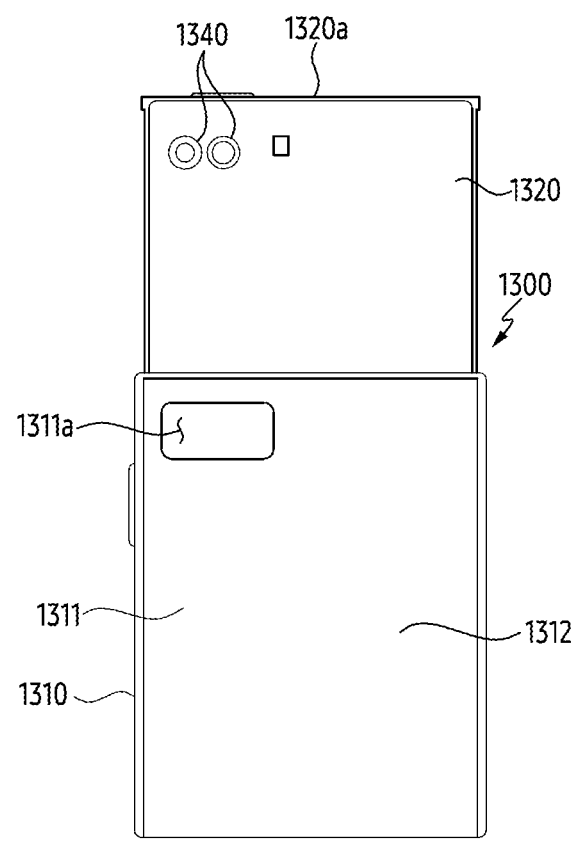
FIG. 13D is a rear view of a second state of the electronic device according to an embodiment.
Figure 14A:
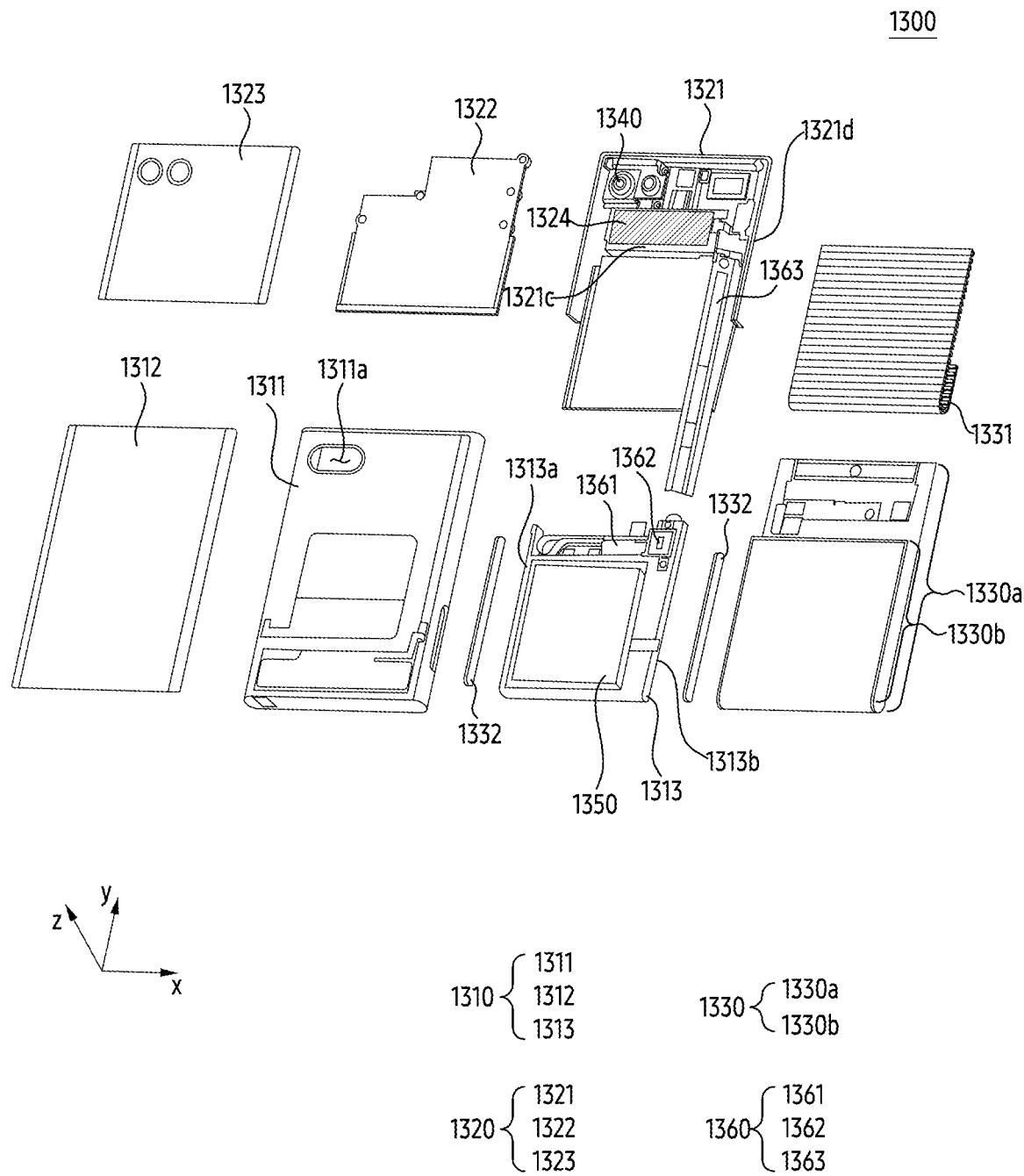
FIG. 14A is an exploded perspective view of an electronic device according to an embodiment.
Figure 14B:
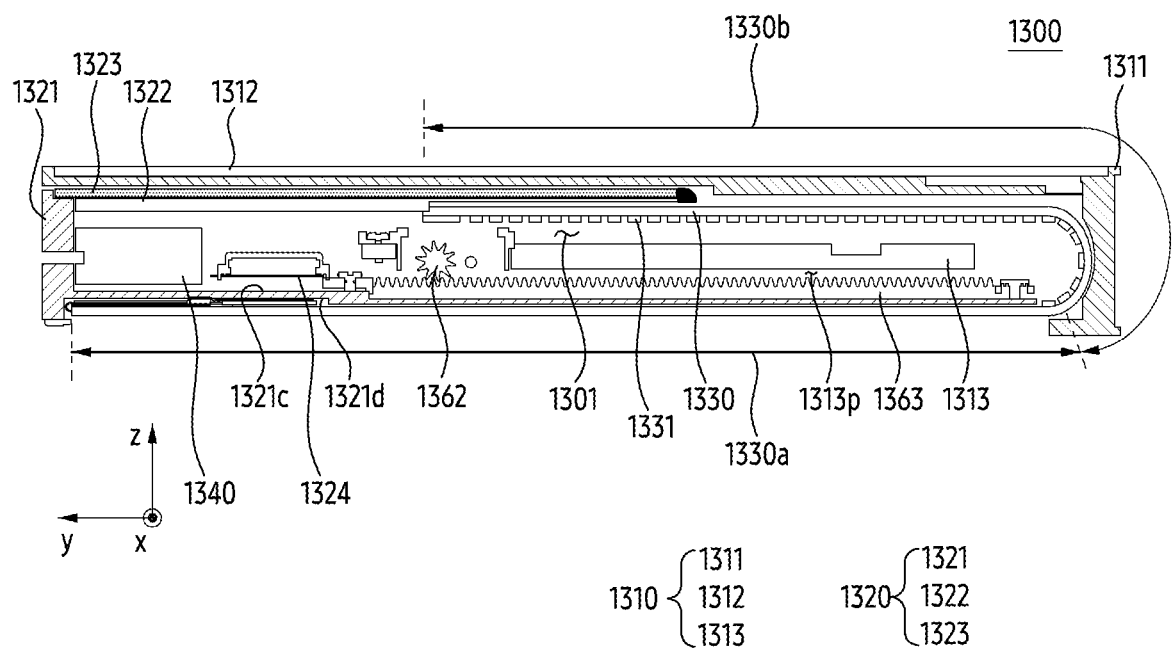
FIG. 14B is a cross-sectional view illustrating an example in which an electronic device taken along A-A' of FIG. 13A.

Referring to FIG. 1, an electronic device 101 may be implemented by an electronic device 1300 shown in FIGS. 13A, 13B, 13C and 13D and an electronic device 1400 shown in FIGS. 14A and 14B.

The electronic device 101 may include a processor (e.g., including processing circuitry) 120, a memory 130, and a flexible display 140. In an embodiment, the electronic device 101 may further include an actuator (e.g., including actuating circuitry) 150.

For example, the processor 120 may be operably coupled with the memory 130, the flexible display 140, and/or the actuator 150.

For example, the memory 130 may store one or more programs (or one or more software applications) including instructions. For example, the instructions may be included to execute at least a part of the operations illustrated through the descriptions of FIGS. 3 to 12.

For example, the flexible display 140 may change a display state of a display area of the flexible display 140 based on a control of the processor 120.

For example, the actuator 150 may include various circuitry including, for example, a driving unit (e.g., including driving circuitry) 1360 illustrated in FIGS. 14A and 14B. For example, the actuator 150 may slide at least a part of the flexible display 140 into a housing of the electronic device 101 or slide out the at least the part of the flexible display 140 from the housing, based on the control of the processor 120.

For example, the flexible display 140 may be at least partially slid into the housing of the electronic device 101 through the actuator 150. For example, the flexible display 140 may be a display that may be at least partially rollable into the housing. The flexible display 140 may be at least partially slid out from the housing through the actuator 150. For example, the flexible display 140 may be at least partially visible outside the housing. For example, the flexible display 140 may include a display area that is at least partially exposed (as used herein, the term "exposed" may be used interchangeably with the term "visible" or "viewable" and covers a situation in which the display is visible regardless of the presence or absence of a cover layer, cover glass, protective layer, or the like disposed over the display) outside the housing. For example, the flexible display 140 may provide a plurality of states according to the sliding into the housing or the sliding outside from the housing. For example, the size of the display area may be different within each of the plurality of states. For example, the plurality of states provided by the flexible display 140 may be illustrated through FIG. 2.

Figure 2:
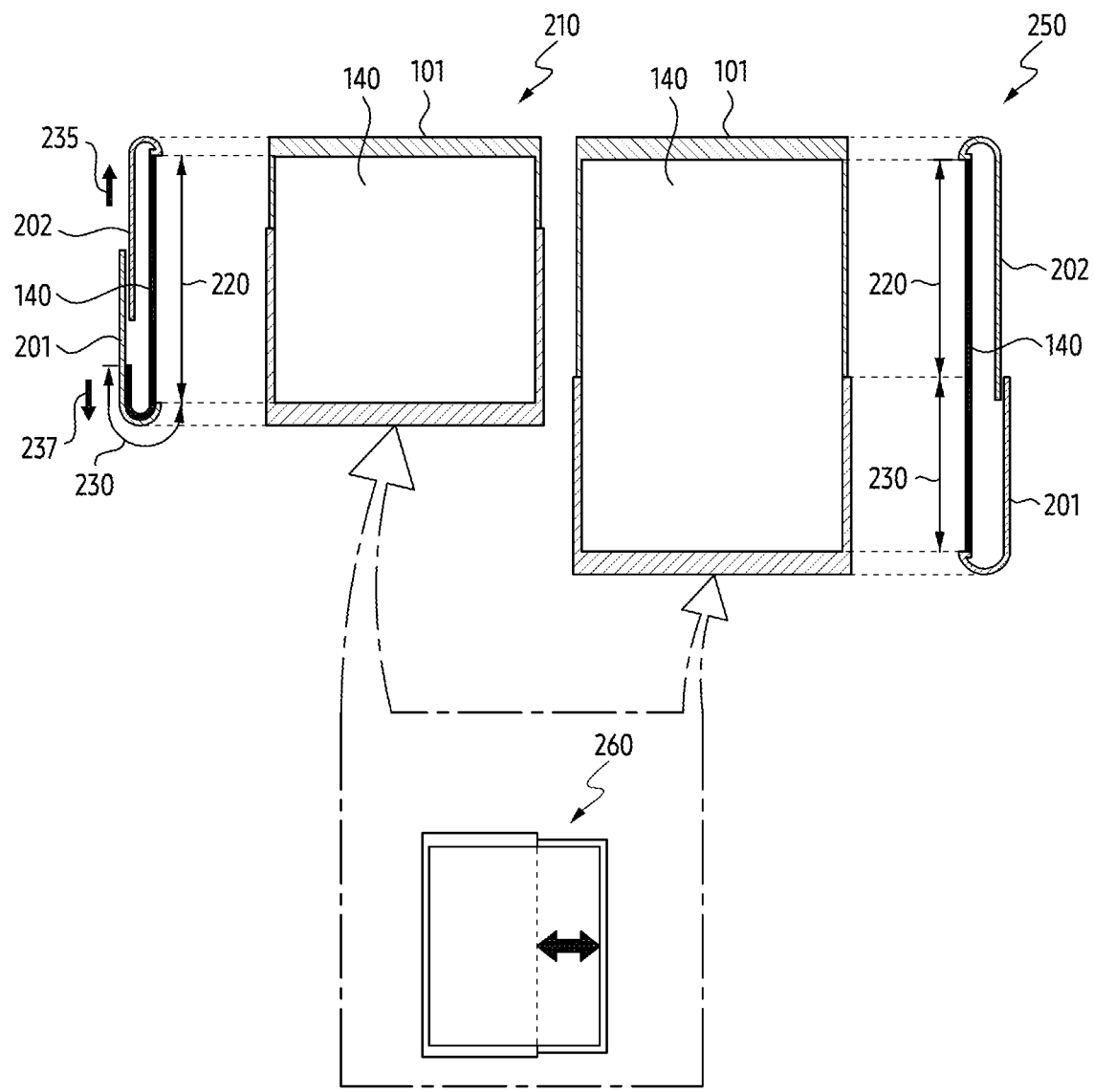
FIG. 2 illustrates an example of changing size of a display area of a flexible display of an electronic device.

FIG. 2 illustrates an example of changing size of a display area of a flexible display of an electronic device.

Referring to FIG. 2, the flexible display 140 may provide a first state 210 in which a part of the flexible display 140 is exposed (e.g., visible) and other part of the flexible display 140 is slid into a first housing 201 among the first housing 201 and a second housing 202, as a state among the plurality of states. In an embodiment, the first state 210 may be a state of providing a viewable area having a minimum area (or size). In an embodiment, the first state 210 may be a state in which the flexible display 140 provides a display area having a minimum area. In the first state 210, the display area having a minimum area may be referred to as the first area 220. In the first state 210, the area of the flexible display 140 slid into the first housing 201 may be referred to as the second area 230. In the first state 210, the first area 220 may be a viewable area. In the first state 210, the first area 220 may be an area exposed (e.g., visible or viewable) outside the first housing 201. In the first state 210, the second area 230 may be a non-viewable area by sliding into the first housing 201. In the first state 210, the second area 230 may be an area covered with the first housing 201 by sliding into the first housing 201. For convenience of explanation, the disclosure describes that the second area 230 is non-viewable when sliding into the first housing 201, assuming that the first housing 201 and the second housing 202 are formed of opaque materials, but this is simply an example, and at least a partial area of the first housing 201 and/or the second housing 202 may be formed of a transparent material. In this case, even when the second area 230 is slid into the first housing 201, at least a part of the second area 230 may be viewable through the first housing 201.

The flexible display 140 may provide a second state 250 in which the flexible display 140 is maximally exposed (e.g., visible or viewable) as another state among the plurality of states. In an embodiment, the second state 250 may be a state in which the flexible display 140 provides a visible area having a maximum area (or size). The second state 250 may be a state in which the flexible display 140 provides a display area having a maximum area. In the second state 250, the first area 220 and the second area 230 may be visible areas. In the second state 250, the first area 220 and the second area 230 may be areas exposed outside the first housing 201.

Although not shown in FIG. 2, the flexible display 140 may provide an intermediate state between the first state 210 and the second state 250. The intermediate state may refer to a state in which a part of the first area 220 and the second area 230 is exposed, and a remaining part of the second area 230 is slid into the first housing 201. In the intermediate state, the part of the first area 220 and the second area 230 may be a visible area. In the intermediate state, the part of the first area 220 and the second area 230 may be an area exposed outside the first housing 201. In the intermediate state, the remaining part of the second part area may be an un non-visible area by sliding into the first housing 201. In the intermediate state, the remaining part of the second area 230 may be a display area covered by the first housing 201 by sliding into the first housing 201.

FIG. 2 illustrates an example in which the second housing 202 is moved or slid in a first direction 235 for conversion from the first state 210 to the second state 250, but this example is provided for convenience of explanation. For example, depending on the implementation or design of the electronic device 101, the first housing 201 may be moved or slid in a second direction 237 opposite to the first direction 235 to transition from the state 210 to the state 250.

On the other hand, a direction in which the display area is extended when the first state 210 is changed to the second state 250 and a direction in which the display area is contracted when the second state 250 is changed to the first state 210 may vary depending on the type of electronic device 101. For example, in portrait mode, the electronic device 101 may be implemented as an electronic device 260 including the display 140 that provides the display area extending in a first horizontal direction or contracting in a second horizontal direction opposite to the first horizontal direction. However, the disclosure is not limited thereto.

Figure 3:
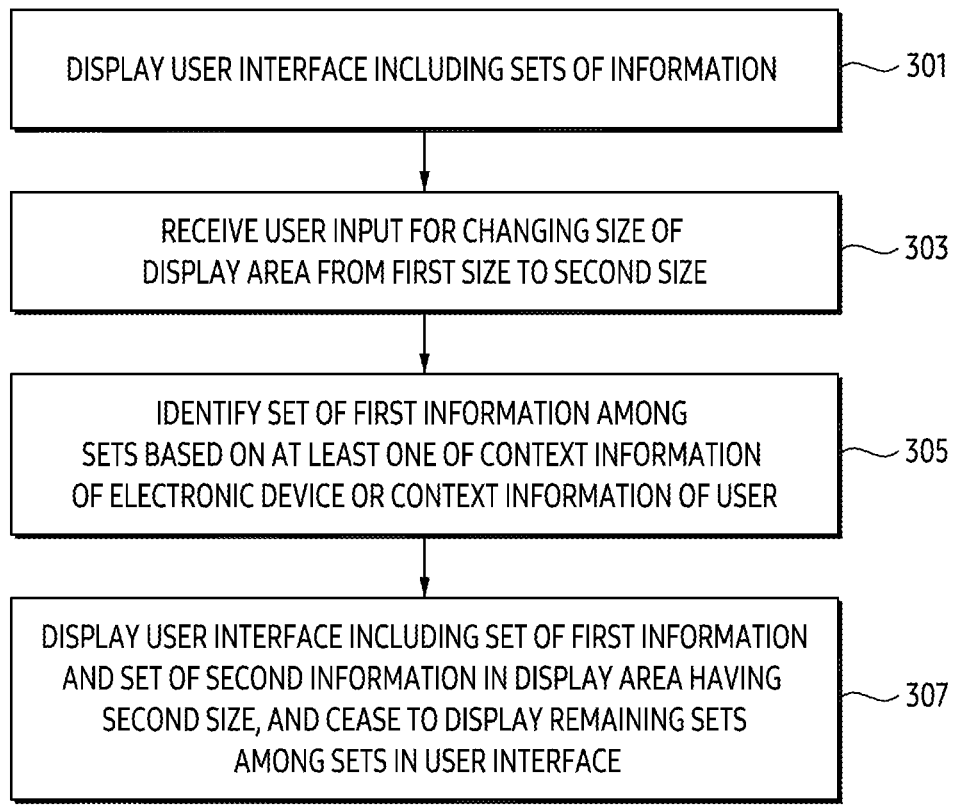
FIG. 3 illustrates an exemplary method of identifying a set of first information based on a change in size of a display area.

FIG. 3 illustrates an exemplary method of identifying a set of first information based on a change in size of a display area. This method may be executed by the electronic device 101 or the processor 120 of the electronic device 101 illustrated in FIG. 1.

Figure 4A:
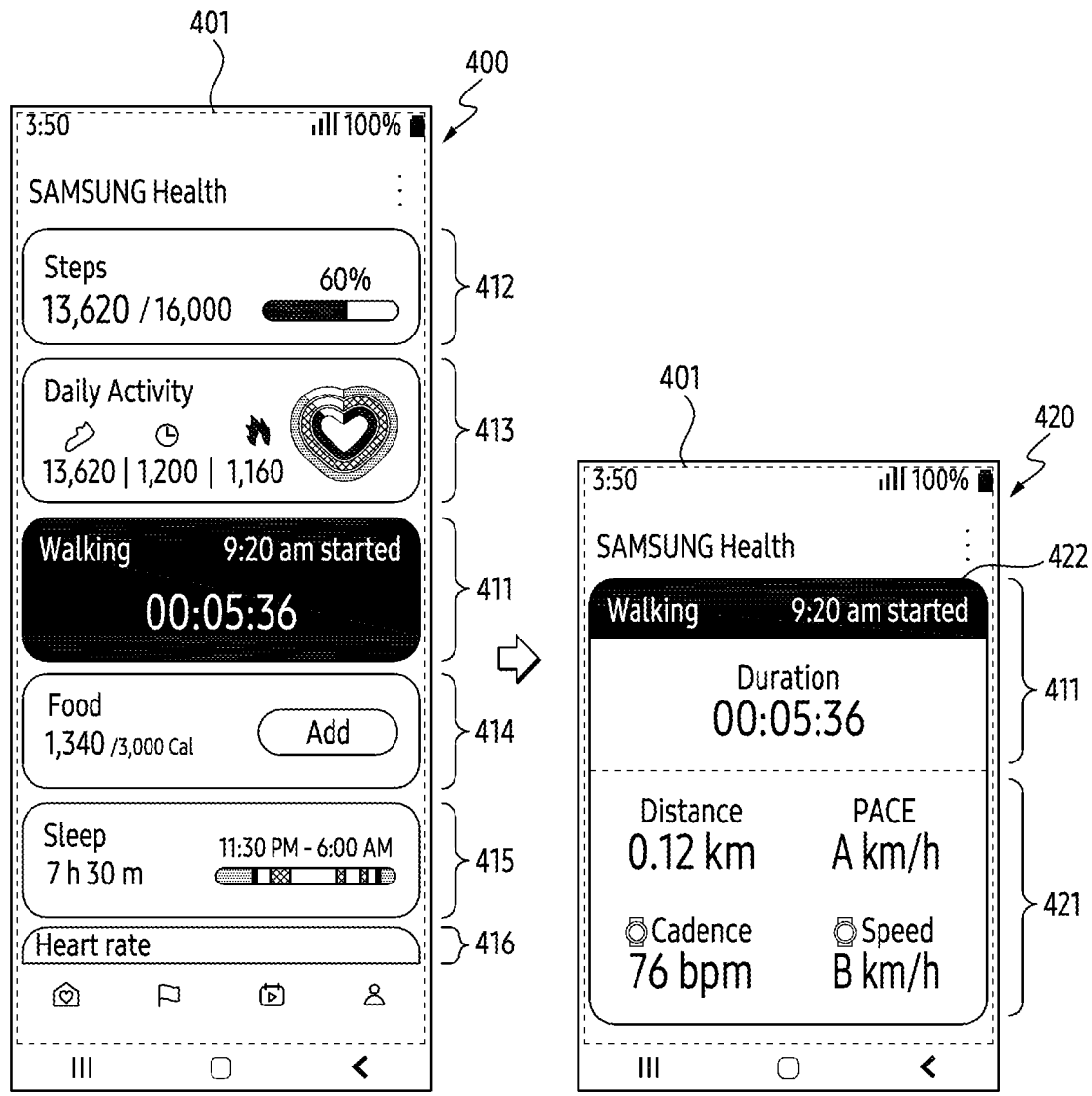
FIG. 4A illustrates an exemplary user interface including a set of first information and a set of second information displayed based on a change in size of a display area.

FIG. 4A illustrates an exemplary user interface including a set of first information and a set of second information displayed based on a change in size of a display area.

Figure 4B:
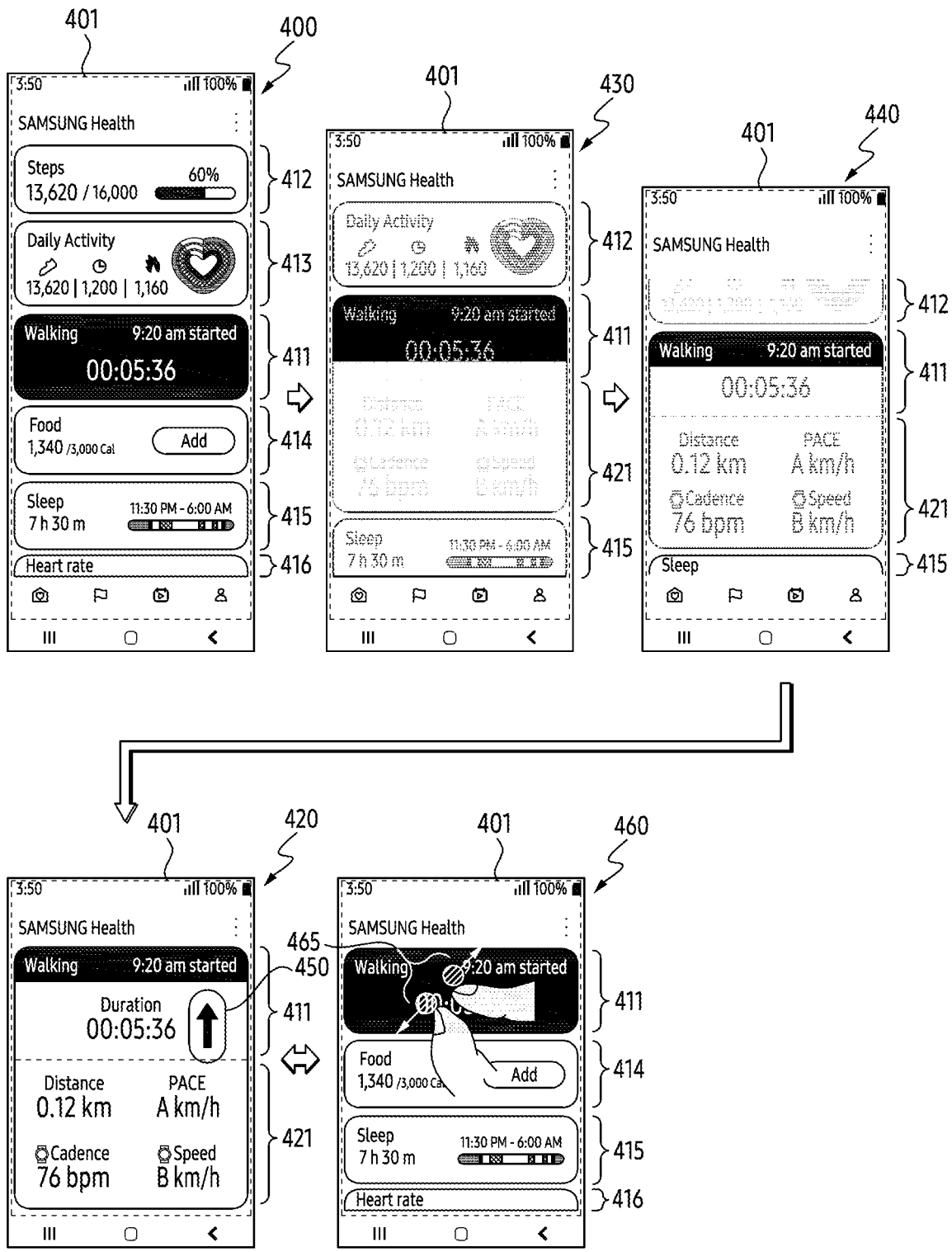
FIG. 4B illustrates an exemplary user interface displayed while size of a display area is changed.

FIG. 4B illustrates an exemplary user interface displayed while size of a display area is changed.

Figure 5A:
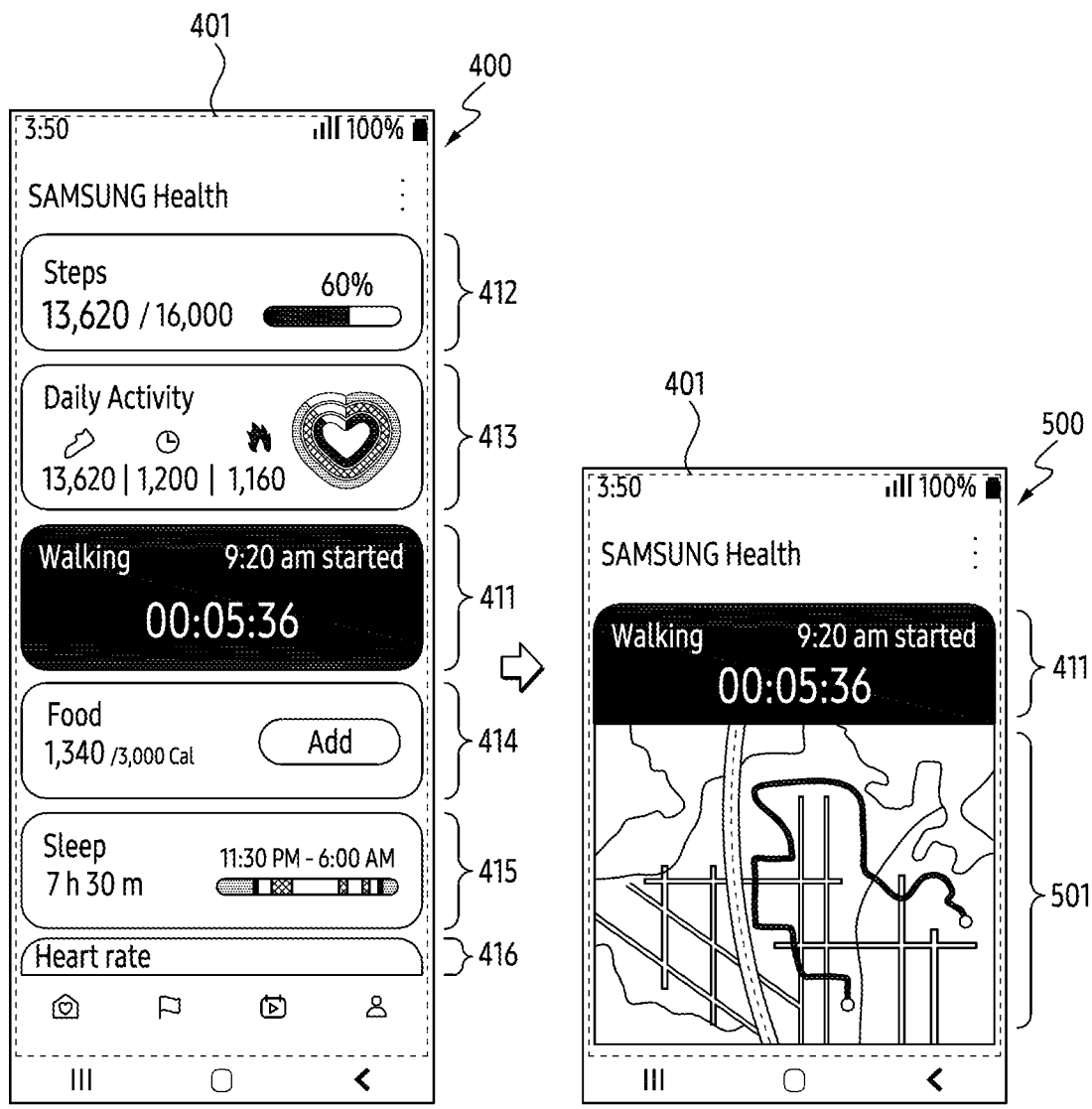
FIG. 5A illustrates an exemplary user interface including a set of first information and a set of second information displayed based on a change in size of a display area.

FIG. 5A illustrates an exemplary user interface including a set of first information and a set of second information displayed based on a change in size of a display area.

Figure 5B:
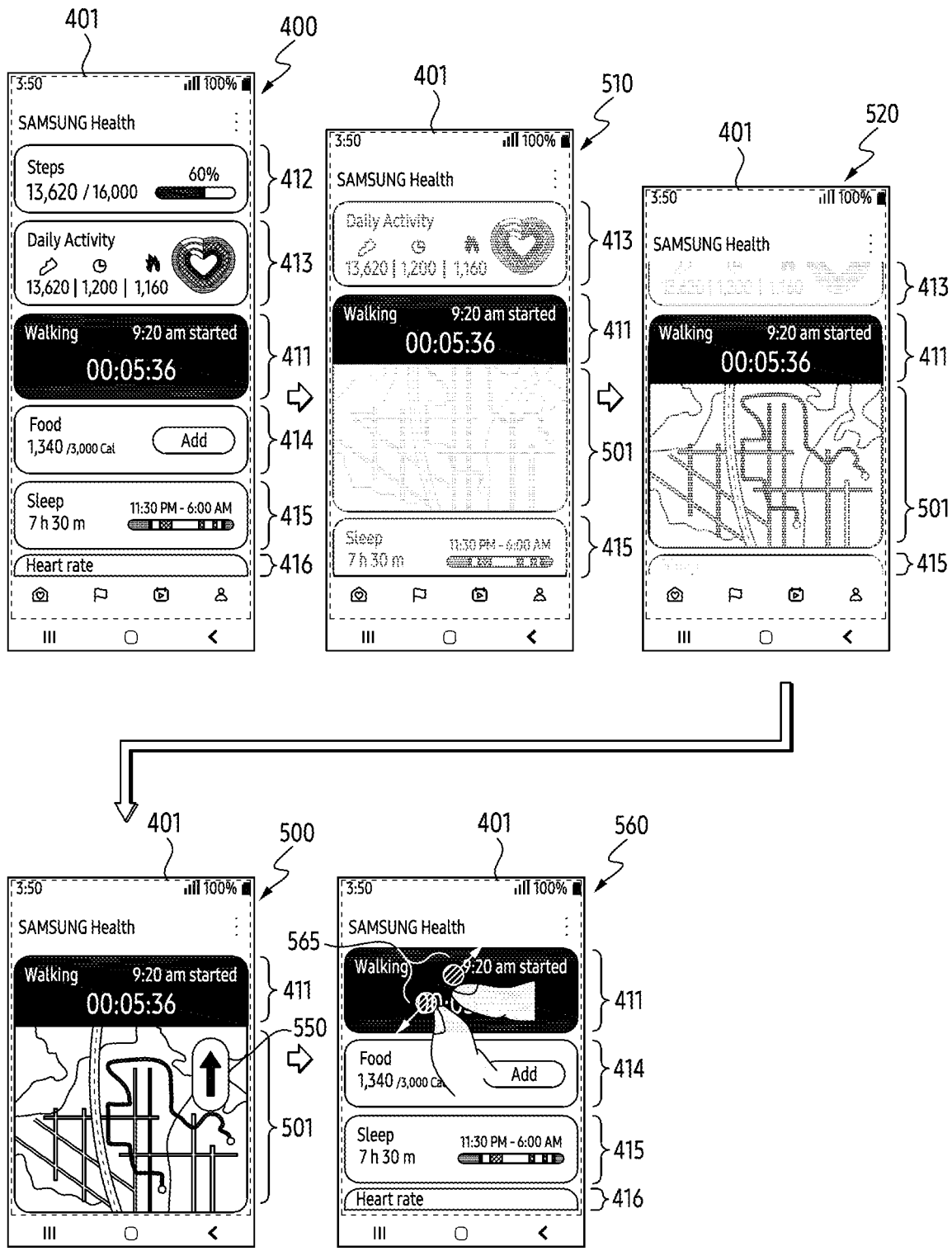
FIG. 5B illustrates an exemplary user interface displayed while size of the display area is changed.
Figure 6:
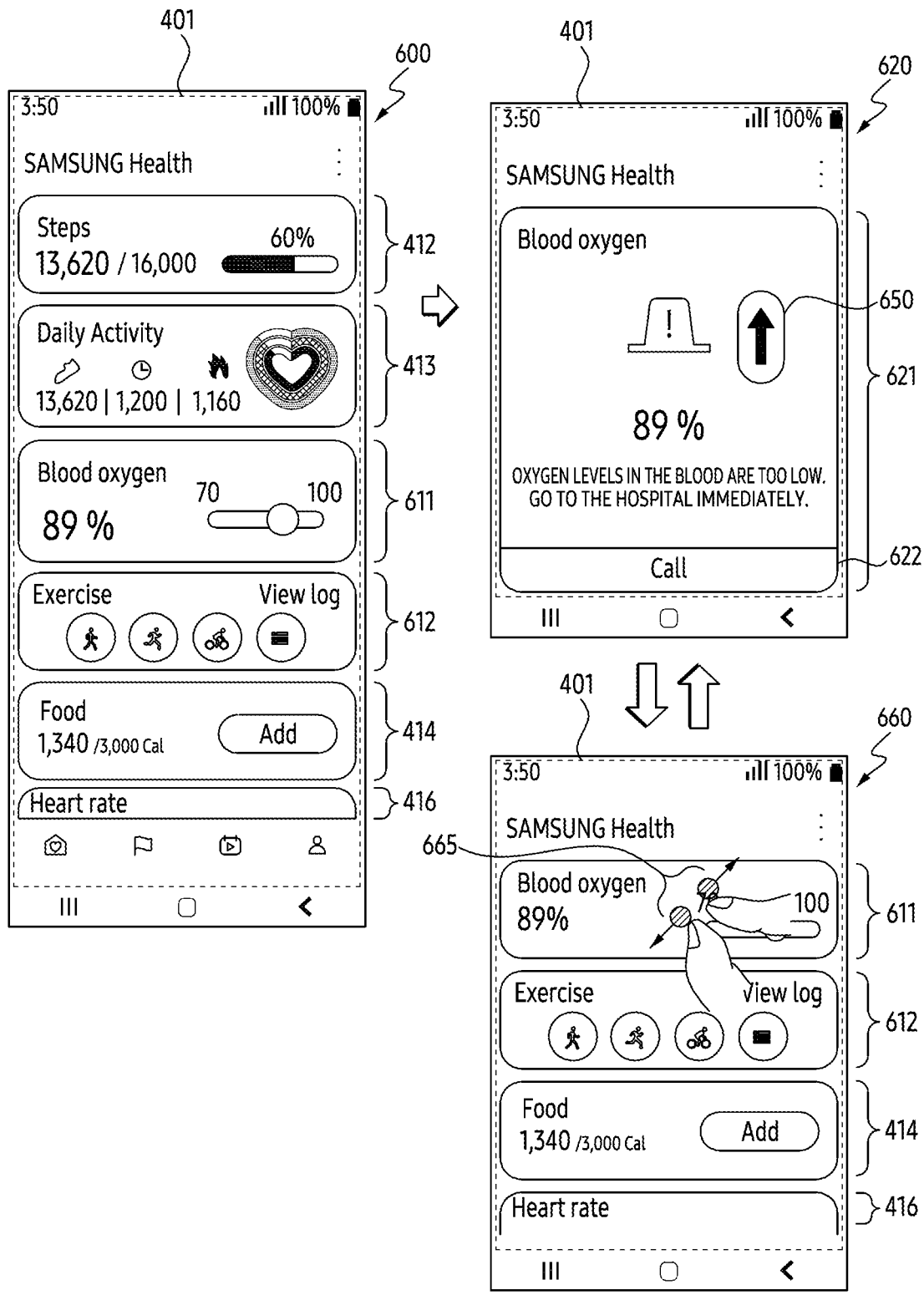
FIGS. 6, 7, 8A, 8B, 8C, and 8D illustrate exemplary user interfaces including a set of first information and a set of second information displayed based on a change in size of a display area.

FIG. 5B illustrates an exemplary user interface displayed while size of the display area is changed.

FIGS. 6 to 8D illustrate exemplary user interfaces including a set of first information and a set of second information displayed based on a change in size of a display area.

Referring to FIG. 3, in operation 301, the processor 120 may display a user interface including sets of information in the display area of the flexible display 140 exposed (e.g., visible or viewable) outside the housing (e.g., the first housing 201) of the electronic device 101.

For example, the user interface may be a screen displayed based on execution of a software application installed in the electronic device 101. For example, the user interface may be displayed to provide information obtained using the software application. For example, the user interface may be displayed to execute a function available through the software application.

For example, each of the sets may be included in the user interface to provide information. For example, each of the sets may include at least one visual object to provide information. For example, the at least one visual object may be an object having a shape, color, and/or appearance for providing information. For example, the at least one visual object may be an executable object capable of receiving a user input for executing a function assigned to the at least one visual object. However, the disclosure is not limited thereto.

For example, the sets may be distinguished from each other.

For example, the sets may be visually distinguished from each other. For example, one set among the sets may be visually distinguished to indicate that it is distinct from at least one other set among the sets. For example, an area displaying the first set among the sets may be visually different from an area displaying the second set among the sets. For example, the first set among the sets may be displayed within (or on) a first card, and the second set among the sets may be displayed within (or on) a second card separated from the first card. However, the disclosure is not limited thereto.

For example, the sets may be distinguished from each other by category. For example, a category of information provided through one set among the sets may be different from a category of information provided through at least one other set among the sets. For example, the first set of the sets may be included in the user interface to provide information related to a function of a first category (or a service of a first category) among a plurality of functions (or services) provided through the software application, and the second set of the sets may be included in the user interface to provide information related to a function of a second category (or a service of a second category) distinguished from the first category among the plurality of functions (or services). However, the disclosure is not limited thereto.

For example, the sets may be distinguished from each other by theme. For example, a theme of information provided through one set among the sets may be different from a theme of information provided through at least one other set among the sets. For example, the first set among the sets may be included in the user interface to provide information related to a function of a first theme (or a service of a first theme) among the plurality of functions (or services) provided through the software application, and the second set among the sets may be included in the user interface to provide information related to a function of a second theme distinguished from the first theme among the plurality of functions. However, the disclosure is not limited thereto.

For example, the sets may be distinguished from each other by type. For example, the type of information provided through one set of the sets may be different from the type of information provided through at least one other set of the sets. For example, the first set of the sets may be included in the user interface to provide information of a first type, and the second set of the sets may be included in the user interface to provide information of a second type different from the first type. However, the disclosure is not limited thereto.

For example, the sets may be distinguished from each other for each time interval. For example, the first set of the sets may be included in the user interface to provide information on a first time interval, and the second set of the sets may be included in the user interface to provide information on a second time interval different from the first time interval. However, the disclosure is not limited thereto.

For example, the sets may be distinguished from each other by devices that obtain data used to obtain information provided through the sets. For example, the first set of the sets may be included in the user interface to provide information obtained based on data obtained using a first device (e.g., a component of the electronic devices 101 or a component of an external electronic device), and the second set of these sets may be included in the user interface to provide information obtained based on data obtained using a second device different from the first device (e.g., another component of the electronic device 101 or another component of the external electronic device). However, the disclosure is not limited thereto.

For example, the sets may be distinguished from each other by a format of information provided through each of the sets. For example, the first set of the sets may include an image, and the second set of the sets may include a text. However, the disclosure is not limited thereto.

For example, referring to FIG. 4A, the processor 120 may display a user interface 401 within a display area (e.g., the display area in the second state 250) having a first size, such as the state 400. For example, the user interface 401 may include the sets including a set 411, a set 412, a set 413, a set 414, a set 415, and a set 416. For example, the set 411 of the sets may provide a first information (e.g., time of walking exercise) identified (or obtained) using a software applications (e.g., a software applications for health service) executed to provide services through the user interface 401, the set 412 of the sets may provide a second information (e.g., the user's daily cumulative number of steps) identified using the software application, the set 413 of the sets may provide a third information (e.g., user's daily activity information) identified using the software application, the set 414 of the sets may provide a fourth information (e.g., daily food intake) identified using the software application, the set 415 of the sets may provide a fifth information (e.g., user's sleep time) identified using the software application, and a part of the set 416 of the sets may provide a sixth information (e.g., user's heart rate information) identified using the software application. However, The disclosure is not limited thereto.

Referring back to FIG. 3, in operation 303, the processor 120 may receive an input, e.g., a user input, for changing the size of the display area from the first size to a second size smaller than the first size. For example, the user input may be received while the user interface including the sets of the information is displayed within the display area having the first size. For example, the user input may be an input to a physical button exposed through a part of the housing (e.g., the first housing 201 or the second housing 202) of the electronic device 101. For example, the user input may be a touch input for an executable object displayed in the display area having the first size. For example, the user input may be a user input that pulls or pushes the housing (e.g., the first housing 201 or the second housing 202) of the electronic device 101. For example, the user input may be a user input identified by an external electronic device (e.g., earbuds or smartwatch) connected to the electronic device 101. However, the disclosure is not limited thereto.

In operation 305, in response to the user input, the processor 120 may identify a set of first information among the sets based on at least one of context information of the electronic device 101 or context information of the user of the electronic device 101.

For example, the context information of the electronic device 101 may refer, for example, to information indicating a state of the electronic device 101 related to an external object (e.g., a user or an external electronic device) and/or a state of the electronic device 101 independent of the external object. For example, the context information of the electronic device 101 may include information on environment in which the electronic device 101 is located, information on services provided by the electronic device 101, information on function running in the electronic device 101, and/or information on a state of a relationship between the electronic device 101 and a user. However, the disclosure is not limited thereto.

For example, the context information of the electronic device 101 may be identified or obtained based on at least one of data generated within the electronic device 101 or data received from the external electronic device. For example, the context information of the electronic device 101 may include at least one of location of the electronic device 101, environmental information including the location of the electronic device 101, information on a function executed in the electronic device 101, or information on a function executed in the external electronic device according to the function executed in the electronic device 101. However, the disclosure is not limited thereto.

For example, the context information of the electronic device 101 may be identified or obtained based on past execution heuristics including a use history of the electronic device 101. For example, the context information of the electronic device 101 may be identified or obtained based on a state of a volatile memory (e.g., the memory 130) of the electronic device 101. However, disclosure is not limited thereto.

For example, the context information of the user may refer, for example, to information indicating the user's state related to the electronic device 101 and/or the user's state independent of the electronic device 101, and wherein the information may be identified by the electronic device 101 and/or the external electronic device linked to the electronic device 101. For example, the user's context information may include information on the environment in which the user is located, information on a service provided from the electronic device 101 to the user, information on the user's action related to the electronic device 101, information on the user's action independent of the electronic device 101, information on services provided to the user from the external electronic device linked to the electronic device 101, information on the user's actions related the external electronic device linked to the electronic device 101, and/or information on a state of a relationship between the external electronic device linked to the electronic device 101 and the user. However, the disclosure is not limited thereto.

For example, the context information of the user may be identified based on based on data (e.g., biometric data and/or data on the user's interaction) related to the user obtained through the sensor of the electronic device 101 and/or data (e.g., biometric data obtained through the sensor of the external electronic device and/or data on the user's interaction caused in relation to the external electronic device) related to the user received from the external electronic device. For example, the context information of the user may include the user's location, environmental information including the user's location, and/or information on the action performed by the user. However, the disclosure is not limited thereto.

For example, the context information of the user may be identified or obtained based on past execution heuristics including past use history of the electronic device 101 of the user. For example, the context information of the user may be obtained or identified based on a state of the volatile memory of the electronic device 101 or a state of data stored in a non-volatile memory of the electronic device 101. However, the disclosure is not limited thereto.

For example, a set of the first information may refer, for example, to a set that will be included in the user interface to be displayed in the display area decreased based on the change from the first size to the second size.

For example, the set of the first information may be a set of information for providing important information than remaining sets among the sets whose display will be stopped according to the change to the second size. For example, the set of the first information may be a set having the highest priority among the sets. For example, the set of first information may be a set in which change of display is most frequently executed among the sets before the user input is received. For example, the set of first information may be a set in which change of display is most recently executed among the sets. For example, the set of the first information may be a set including data outside reference range among the sets. For example, the set of first information may be a visually highlighted set among the sets when the user input is received. For example, the set of the first information may be a set focused among the sets when the user input is received. For example, the set of first information may be identified as a set corresponding to the current position of the electronic device 101 among the sets. However, the disclosure is not limited thereto.

In operation 307, the processor 120 may display the user interface including the set of first information and the set of second information in the display area having the second size changed from the first size, and may cease to display remaining sets among the sets in the user interface.

For example, the set of the second information is related to the set of the first information and may be different from the sets. For example, the set of second information may be a set of information not included in the user interface displayed in the display area having the first size and may be a set of information for providing a service corresponding to a service provided through the set of the first information or a function corresponding to a function provided through the set of the first information. For example, since the electronic device 101 in the state of providing the display area having the second size provides enhanced portability than the electronic device 101 in the state of providing the display area having the first size, the set of the second information may be displayed to enhance a service, or a function provided through the set of the first information in terms of portability.

For example, the second information may be additional information of the first information. For example, the second information may be detailed information of the first information. For example, the second information may be information obtained by processing data used to obtain the first information according to another example distinct from the example obtaining the first information. For example, the second information may be information identified or obtained based on second data distinguished from first data used to identify or obtain the set of the first information. For example, the second information may be information for providing the same service as the first information, but information distinguished from the first information. For example, the second information may be information for providing the same function as the first information, but information distinguished from the first information. However, the disclosure is not limited thereto.

For example, since the second size is smaller than the first size, the processor 120 may display the set of the first information, which is the highest priority set among the sets, and may cease to display the remaining sets of the sets. For example, since a change from the first size to the second size may refer, for example, to a change in a state of the electronic device 101 from a state suitable for providing various information to a state suitable for providing specific information intensively, the processor 120 may display the set of the first information and the set of the second information, and may cease to display the remaining sets.

For example, referring to FIG. 4A, the processor 120 may receive a user input as in operation 303 in the state 400. The processor 120 may change the state 400 to the state 420 in response to the user input. For example, the processor 120 may change the state 400 to the state 420 according to the change of the display area from the first size to the second size. For example, in the state 420, the processor 120 may display the user interface 401 in the display area having the second size. For example, in the state 420, the user interface 401 may include a set 411 that is the set of the first information and a set 421 that is the set of the second information. For example, the set 421 may be different from each of a set 411, a set 412, a set 413, a set 414, a set 415, and a set 416 in the user interface 401 of the state 400. For example, the set 421 may be a set newly displayed in the state 420. For example, the set 421 may be a set newly displayed in the state 420, and a set related to the set 411. For example, the set 421 may include information on a distance walked by a user identified using the electronic device 101 during a walking exercise, information on the average speed of the user identified using the electronic device 101 during the walking exercise, information on the average heart rate of the user identified using a smartwatch linked to the electronic device 101 during the walking exercise, and information on the average speed of the user identified using the smartwatch during the walking exercise, wherein the above information is not provided through the set 411 providing services related to the walking exercise.

For example, in the state 420, the user interface 401 may not include the set 412, the set 413, the set 414, the set 415, and the set 416, among the sets including the sets 411 to 416. For example, the user interface 401 within the state 420 may include the set 411 and the set 421 and may not include the sets 412 to 416 for a user experience that intensively provides information instead of a user experience that provides various information.

For example, the user interface 401 within the state 420 may include the set 411 and the set 421 extending from the set 411 to indicate that the set 411 and the set 421 are related. For example, the user interface 401 within the state 420 may provide the set 411 and the set 421 on or within a single card 422 to indicate that the set 411 and the set 421 are related. However, the disclosure is not limited thereto.

In an embodiment, the state 400 may be changed to the state 420 through a plurality of intermediate states. For example, referring to FIG. 4B, the processor 120 may change the state 400 to the state 430 while the size of the display area is changed from the first size to the second size.

For example, in the state 430, the processor 120 may cease to display the set 413, set 414, and set 416 within the user interface 401.

For example, in the state 430, the processor 120 may change representation of the set 412 and the set 415 that will be ceased to display within the state 420. For example, in the state 430, the processor 120 may reduce the opacity of each of the set 412 and the set 415 that will be ceased to display within the state 420. For example, the processor 120 may reduce the opacity of each of the set 412 and the set 415, so that the set 412 and the set 415 are faded out each of the set 412 and the set 415 according to the change from the state 400 to the state 420 through the state 430 and the state 440.

For example, in the state 430, the processor 120 may change representation of the set 421. For example, in the state 430, the processor 120 may increase the opacity of the set 421. For example, the processor 120 may increase the opacity of the set 421 so that the set 421 are faded in according to the change from the state 400 to the state 420 through the state 430 and the state 440.

For example, in the state 430, the processor 120 may change the representation of the set 411. For example, since the set 411 is displayed with the set 421 in the state 420, the processor 120 may change the representation of the set 411 in the state 430. For example, in the state 430, the processor 120 may change a part of the background color of the set 411.

For example, the processor 120 may change the state 430 to the state 440 while the size of the display area is changed from the first size to the second size.

For example, in the state 440, the processor 120 may change the representation of the set 412 and the set 415 whose display is to be ceased within the state 420. For example, in the state 440, the processor 120 may display a part of the set 412 and a part of the set 415. For example, in the state 440, the processor 120 may reduce the opacity of the set 412 and the set 415 for fading out of the set 412 and the set 415.

For example, in the state 440, the processor 120 may change the representation of the set 421. For example, in the state 440, the processor 120 may increase the opacity of the set 421. For example, the processor 120 may increase the opacity of the set 421 for fading in the set 421.

For example, in the state 440, the processor 120 may change the representation of the set 411. For example, since the set 411 is displayed with the set 421 in the state 420, the processor 120 may change the representation of the set 411 in the state 440. For example, in the state 440, the processor 120 may increase the opacity of the set 411.

For example, the processor 120 may change the state 440 to the state 420.

For example, in the state 420, the processor 120 may receive the user input 450 for resuming display of at least one of the set 412, the set 413, the set 414, the set 415, and the set 416. For example, the user input 450 may be caused for scrolling content within the user interface 401, such as the set 411 and the set 421. For example, the user input 450 may be a swipe input (or sweeping input) that a touch input contacted on the display area with the second size is moved and is released. For example, the processor 120 may change the state 420 to the state 460 in response to the user input 450.

For example, in the state 460, the processor 120 may resume displaying at least a part of the set 412, the set 413, the set 414, the set 415, or the set 416. For example, in the state 460, the processor 120 may cease to display the set 421, and may display the set 414, the set 415, and a part of the set 416. For example, the representation of the set 411 displayed with the set 414, the set 415, and a part of the set 416 may be different from the representation of the set 411 displayed with the set 421. For example, the representation of the set 411 in the state 460 may correspond to the representation of the set 411 in the state 400, and may be different from the representation of the set 411 in the state 420. However, the disclosure is not limited thereto.

For example, in the state 460, the processor 120 may receive a user input 465. For example, the user input 465 may be a touch input for zooming in the user interface 401 (or the set 411). For example, the processor 120 may change the state 460 to the state 420 in response to the user input 465. For example, as in the state 420, in response to the user input 465, the processor 120 may cease to display the set 414, the set 415, and a part of the set 416, and resume displaying the set 421 with the set 411. However, the disclosure is not limited thereto.

As another example, referring to FIG. 5A, the processor 120 may change the state 400 to the state 500 in response to receiving the user input for changing the size of the display area to the second size. For example, in the state 500, the processor 120 may display the set 501 which is a set of the second information together with the set 411 within the user interface 401. For example, the set 501 may provide information different from the set 421 in FIGS. 4A and 4B. For example, the set 501 may provide information on a path of walking exercise. For example, the set 501 may include an electronic map and a visual object indicating a path overlapped on the electronic map.

For example, the set 501 may be different from each of the sets 411, 412, 413, 414, 415 and 416 within the user interface 401 of the state 400. For example, the set 501 may be a newly displayed set in the state 500. For example, the set 501 may be a set newly displayed within the state 500 or a set related to the set 411 (e.g., a set for providing a path to walking exercise).

For example, the user interface 401 in the state 500 may include the set 411 and set 501 extending from the set 411 to indicate that the set 411 and the set 501 are related. For example, the user interface 401 in the state 500 may provide the set 411 and the set 501 on or within a single card 502 to indicate that the set 411 and the set 501 are related. However, the disclosure is not limited thereto.

In an embodiment, the state 400 may be changed to the state 500 through a plurality of intermediate states. For example, referring to FIG. 5B, the processor 120 may change the state 400 to the state 510 while the size of the display area is changed from the first size to the second size.

For example, in the state 510, the processor 120 may cease to display the set 412, the set 414, and the set 416 within the user interface 401.

For example, in the state 510, the processor 120 may change the representation of the set 413 and the set 415 that will be ceased to display within the state 500. For example, the processor 120 may reduce the opacity of the set 413 and the set 415 to cause the set 413 and the set 415 to be faded out (or to be faded down) according to the change from the state 400 to the state 500 through the state 510 and the state 520.

For example, in the state 510, the processor 120 may change the representation of the set 501. For example, in the state 510, the processor 120 may increase the opacity of the set 501. For example, the processor 120 may increase the opacity of the set 501 so that the set 501 are faded in according to the change from the state 400 to the state 500 through the state 510 and the state 520.

For example, in the state 510, the processor 120 may change the representation of the set 411. For example, since the set 411 is displayed with the set 501 in the state 500, the processor 120 may change the representation of the set 411 in the state 510. For example, in the state 510, the processor 120 may change a part of the shape of the set 411.

For example, the processor 120 may change the state 510 to the state 520 while the size of the display area is changed from the first size to the second size.

For example, in the state 520, the processor 120 may cease to display the set 413 in the user interface 401.

For example, in the state 520, the processor 120 may change the representation of the set 413 and the set 415 that will be ceased to display in the state 500. For example, in the state 520, the processor 120 may display a part of the set 413 and a part of the set 415. For example, in the state 520, the processor 120 may reduce the opacity of the set 413 and the set 415 for fading out of the set 413 and the set 415.

For example, in the state 520, the processor 120 may change the representation of the set 501. For example, in the state 520, the processor 120 may increase the opacity of the set 501. For example, the processor 120 may increase the opacity of the set 501 for fading in of the set 501.

For example, in the state 520, the processor 120 may change the representation of the set 411. For example, since the set 411 is displayed with the set 501 in the state 500, the processor 120 may change the representation of set 411 in the state 520. For example, in the state 520, the processor 120 may adjust the color of the set 411 based on the color of the set 501.

For example, the processor 120 may change the state 520 to the state 500.

For example, in the state 500, the processor 120 may receive the user input 550 to resume displaying at least one of the set 412, the set 413, the set 414, the set 415, or the set 416. For example, the user input 550 may be caused for scrolling of content in the user interface 401, such as the set 411 and the set 501. For example, the user input 550 may be a swipe input (or a sweeping input) that a touch input contacted on the display area with the second size is moved and is released. For example, the processor 120 may change the state 500 to the state 560 in response to the user input 550.

For example, in the state 560, the processor 120 may resume displaying at least a part of the set 412, the set 413, the set 414, the set 415, or the set 416. For example, in the state 560, the processor 120 may cease to display the set 501, and may display the set 414, the set 415, and a part of the set 416. For example, the representation of the set 411 displayed with the set 414, the set 415, and a part of the set 416 may be different from the representation of the set 411 displayed with the set 501. For example, the representation of the set 411 in the state 560 may correspond to the representation of the set 411 in the state 400, and may be different from the representation of the set 411 in the state 500. However, the disclosure is not limited thereto.

For example, in the state 560, the processor 120 may receive the user input 565. For example, the user input 565 may be a touch input for zooming in the user interface 401 (or the set 411). For example, the processor 120 may change the state 560 to the state 500 in response to the user input 565. For example, the processor 120 may cease to display the set 414, the set 415, and a part of the set 416, and resume displaying the set 501 with the set 411, as in state 500, in response to the user input 565. However, the disclosure is not limited thereto.

Referring back to FIG. 3, the set of the first information and the set of the second information displayed in operation 307 may be configured as a set of integrated information. For example, referring to FIG. 6, the processor 120 may display the user interface 401 including the set 412, the set 413, the set 414, the set 416, the set 611, and the set 612, as in the state 600. For example, in the state 600, the set 611 may be included in the user interface 401 to provide information on the blood oxygen concentration of the user of the electronic device 101. For example, in the state 600, the set 611 may include data indicating the blood oxygen concentration of the user and a visual object for indicating the range to which the data belongs. For example, in the state 600, the set 611 may provide information obtained based on data outside the reference range, unlike the set 412, the set 413, the set 414, the set 416, and the set 612. Meanwhile, the set 612 may provide information on the user's exercise record.

In the state 600, the processor 120 may receive the user input for changing the size of the display area from the first size to the second size, as shown in operation 303. For example, the processor 120 may change the state 600 to the state 620 in response to the user input. For example, the processor 120 may change the state 600 to the state 620 according to the change of the display area from the first size to the second size. For example, in the state 620, the processor 120 may display the user interface 401 in the display area having the second size. For example, in the state 620, the user interface 401 may include a set of integrated information 621, in which the set of the first information 611 and the set of the second information are integrated. For example, the set 621 may be obtained based on identifying that the set 611 is obtained based on data outside the reference range among the set 412, the set 413, the set 414, the set 416, the set 611, and the set 612. For example, the processor 120 may identify the data indicating the blood oxygen concentration of the user, obtain the set 621 by activating a predetermined function (e.g., emergency call service) based on identifying that the data is outside the reference range, and display the set 621. For example, the set 621 may include an executable object 622 for executing the emergency call service. However, the disclosure is not limited thereto.

For example, in the state 620, the processor 120 may receive the user input 650 to resume displaying at least one of the set 412, the set 413, the set 414, the set 416, or the set 612. For example, the user input 650 may be caused for scrolling content within the user interface 401, such as the set 621. For example, the user input 650 may be a swipe input that a touch input contacted on the display area with the second size is moved and is released. However, the disclosure is not limited thereto.

For example, the processor 120 may change the state 620 to the state 660 in response to the user input 650. For example, in the state 660, the processor 120 may resume displaying the set 414, a part of the set 416, the set 611 and the set 612. For example, in the state 660, the processor 120 may cease displaying the set 621, and may resume displaying the set 414, the part of the set 416, the set 611 and the set 612.

For example, in the state 660, the processor 120 may receive the user input 665. For example, the user input 665 may be a touch input for zooming in at least a part (e.g., the set 611) of the user interface 401. For example, the processor 120 may change the state 660 to the state 620 in response to the user input 665. For example, such as the state 620, in response to the user input 665, the processor 120 may cease to display the set 414, the part of the set 416, the set 611 and the set 612, and may resume displaying the set 621. However, the disclosure is not limited thereto.

Referring back to FIG. 3, the set of the first information and the set of the second information displayed in operation 307 may be hierarchically provided after the size of the display area is changed to the second size. For example, the set of the second information is a set of information derived or deduced from the set of first information and may be displayed in response to a user input to the set of the first information in the user interface displayed in the display area having the second size.

Figure 7:
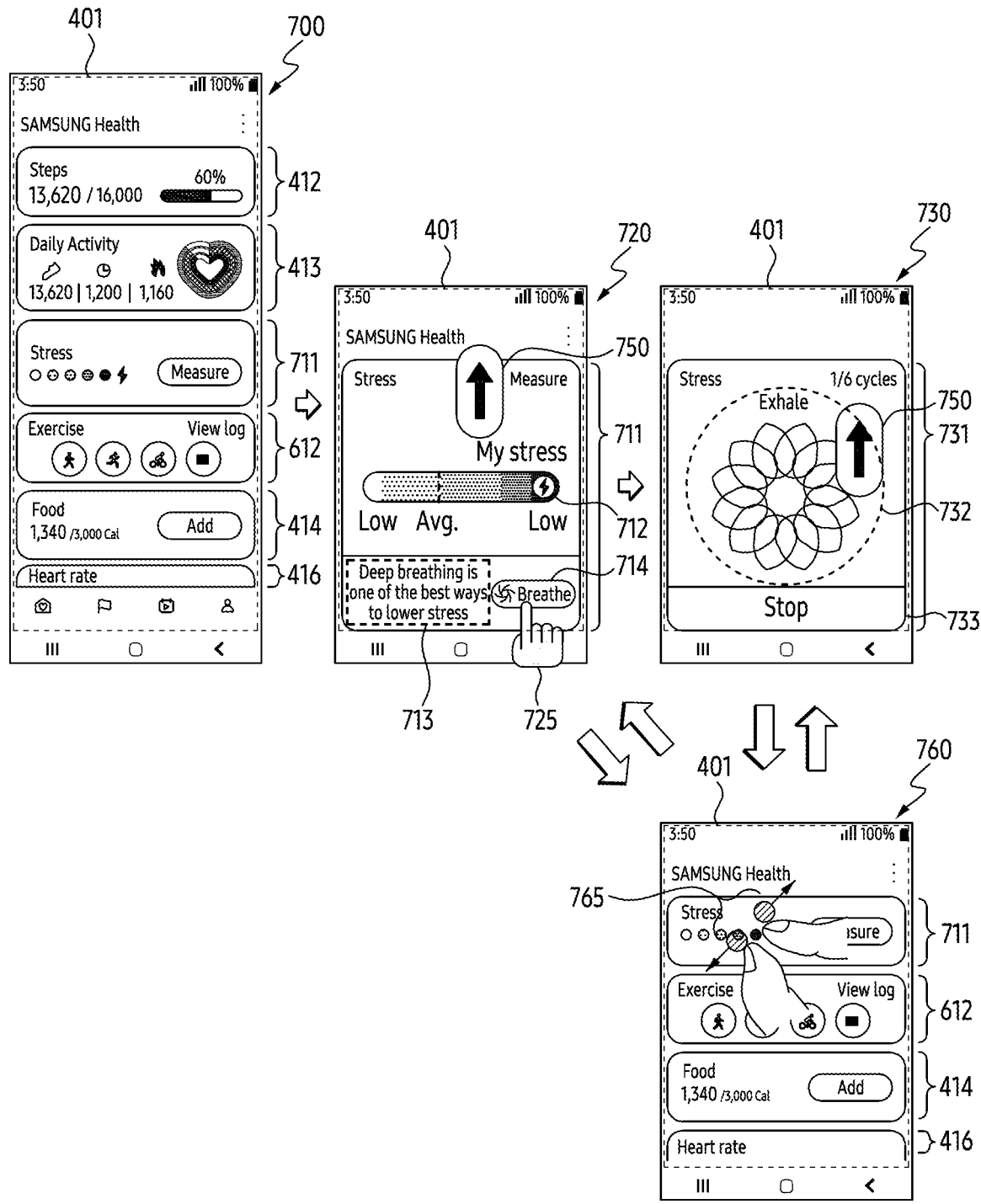

For example, referring to FIG. 7, the processor 120 may display the user interface 401 including the set 412, the set 413, the set 414, the set 416, the set 612, and the set 711, as in the state 700. For example, in the state 700, the set 711 may include data indicating the stress of the user. For example, in the state 700, the set 711 may include an executable object (e.g., measure) for executing a function related to the data.

In the state 700, as in operation 303, the processor 120 may receive the user input for changing the size of the display area from the first size to the second size. For example, the processor 120 may change the state 700 to the state 720 in response to the user input.

For example, in the state 720, the user interface 401 may display the set 711, which is the set of the first information, and may cease to display the set 412, the set 413, the set 414, the set 416, and the set 612. For example, the representation of the set 711 in the state 720 may be different from the representation of the set 711 in the state 700. For example, since the set 711 in the state 720 is displayed in a space larger than the set 711 in the state 700, the set 711 in the state 720 may include information more than the set 711 in the state 700. For example, the set 711 in the state 720 may further include a visual object 712 indicating the range of the data indicating the user's stress, a text 713 guiding that deep breathing is required to reduce the user's stress, and an executable object 714 for displaying the set of the second information, by comparing with the set 711 in the state 700. For example, the set 711 in the state 720 may provide a more enhanced function than the set 711 in the state 700. However, the disclosure is not limited thereto.

For example, the processor 120 may receive a user input 725 for the executable object 714 in the state 720. For example, the processor 120 may change the state 720 to the state 730 in response to the user input 725. For example, in the state 730, the processor 120 may cease to display the set 711 which is the set of the first information within the user interface 401, and display the set 731 which is the set of the second information within the user interface 401. For example, the set 731 may be a set derived from the set 711. For example, in the state 730, the set 731 may include guide information for reducing the user's stress, which is information provided through the set 711. For example, the set 731 may include an animation 732 for providing the guide information and an executable object 733 for stopping the playback of the animation 732. However, the disclosure is not limited thereto.

For example, the processor 120 may receive a user input 750 to resume displaying at least a part of the set 414, the set 416, or the set 416 within the state 720 or the state 730. For example, the user input 750 may be caused for scrolling content in the user interface 401, such as the set 711 or the set 731. For example, the user input 750 may be a swipe input that a touch input contacted on the display area with the second size is moved and is released. However, the disclosure is not limited thereto.

For example, the processor 120 may change the state 720 or the state 730 to the state 760 in response to the user input 750. For example, in the state 760, the processor 120 may resume displaying a part of the set 414, the set 416, the set 612, and the set 711. For example, the representation of the set 711 in the state 760 may be different from the representation of the set 711 in the state 720, and correspond to the representation of the set 711 in the state 700.

For example, in the state 760, the processor 120 may receive a user input 765. For example, the user input 765 may be a touch input for zooming in at least a part (e.g., the set 612) of the user interface 401. For example, the processor 120 may change the state 760 to a state immediately before the state 760 (e.g., the state 720 or the state 730) in response to the user input 765. However, the disclosure is not limited thereto.

Referring back to FIG. 3, The set of the first information and the set of the second information may be changed based on the position of the electronic device 101 (or the position of the user) when the user input for changing the size of the display area to the second size is received and/or the time when the user input is received. For example, the set of the first information and the set of the second information may be changed according to the context information of the electronic device 101 when the user input is received and/or the context information of the user on the electronic device 101 when the user input is received.

Figure 8A:
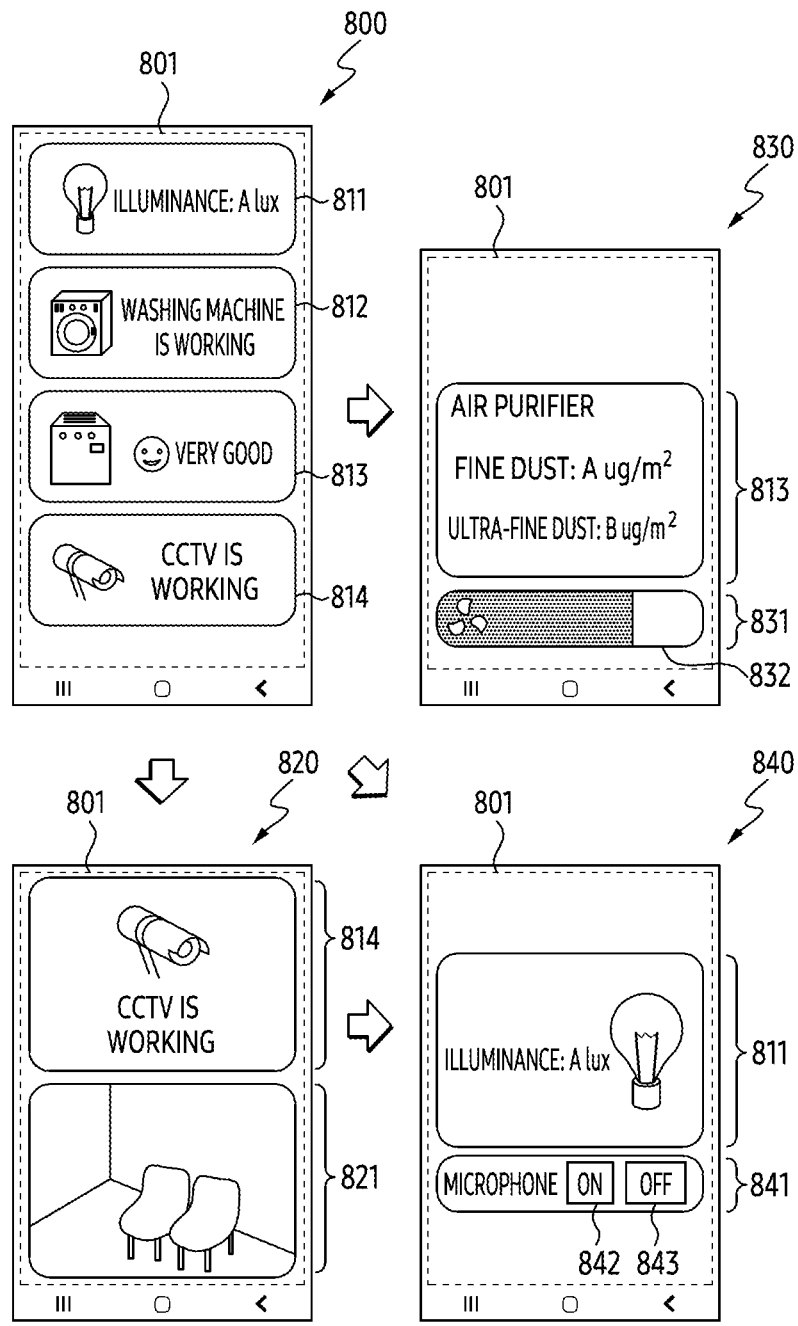

For example, referring to FIG. 8A, the processor 120 may display the user interface 801 in the display area having the first size, such as the state 800. For example, the user interface 801 may be displayed based on the execution of the software application for controlling the external electronic device connected to the electronic device 101 using the electronic device 101. For example, the user interface 801 may include the sets including a set 811, a set 812, a set 813, and a set 814. For example, the set 811 among the sets may provide information related to an electric light connectable to the electronic device 101, the set 812 among the sets may provide information related to a washing machine connectable to the electronic device 101, the set 813 among the sets may provide information related to an air purifier connectable to the electronic device 101, and the set 814 among the sets may provide information related to a closed-circuit television (CCTV) connectable to the electronic device 101. For example, the set 811 may provide information on the illumination provided through the light emitted from the electric light, the set 812 may provide information on the work being done through the washing machine, the set 813 may provide information on air quality in the environment in which the air purifier is located, and the set 814 may provide information on the operating state of the CCTV. However, the disclosure is not limited thereto.

For example, the processor 120 may receive a user input for changing the size of the display area to the second size, in the state 800.

For example, the user input may be received while the electronic device 101 is located outside the user's house. The processor 120 may change the state 800 to the state 820 in response to the user input. For example, in response to the user input, the processor 120 may identify the set 814 among the sets including the set 811, the set 812, the set 813, and the set 814 as the set of first information. For example, based on identifying that the context information of the electronic device 101 indicates that the electronic device 101 is located outside the house, the processor 120 may identify the set 814 among the sets including the sets 811 to 814 as a set with the highest priority. For example, in response to the identification, the processor 120 may display the user interface 801 in the display area having the second size changed from the first size, such as the state 820 changed from the state 800. For example, in the state 820, the user interface 801 may include the set 814 among the sets. For example, in the state 820, the user interface 801 may include the set 821, which is a set of the second information, together with the set 814. For example, the set 821 may include an image of the inside of the house obtained through the CCTV. For example, the set 821 may be a set of information related to the set 814 and different from the sets 811 to 814. However, the disclosure is not limited thereto.

For another example, the user input may be received while the electronic device 101 is located in the house. For example, the user input may be received on a day. For example, in response to the user input, the processor 120 may identify the set 813 among the sets including the set 811, the set 812, the set 813, and the set 814 as the set of the first information. For example, the processor 120 may identify the set 813 among the sets including the sets 811 to 814 as the set with the highest priority based on identifying that the context information of the electronic device 101 indicates that the electronic device 101 is located in the house and that the time when the user input is received is a time zone between 6 a.m. and 10 p.m. For example, in response to the identification, the processor 120 may display the user interface 801 in the display area having the second size changed from the first size, such as the state 830 changed from the state 800. For example, in the state 830, the user interface 801 may include the set 813 among the sets. For example, in the state 830, the user interface 801 may include the set 831 which is a set of the second information together with the set 813. For example, the set 831 may include an executable object 832 for controlling the air purifier. For example, the set 831 may be a set of information related to the set 813 and different from the sets 811 to 814. However, the disclosure is not limited thereto.

As still another example, the user input may be received while the electronic device 101 is located in the house. For example, the user input may be received at night. For example, in response to the user input, the processor 120 may identify the set 811 among the sets including the set 811, the set 812, the set 813, and the set 814, as the set of the first information. For example, the processor 120 may identify the set 811 among the sets including the sets 811 to 814 as the set with the highest priority based on identifying that the context information of the electronic device 101 indicates that the electronic device 101 is located in the house and that the time when the user input is received is a time zone between 10 p.m. and 6 a.m. For example, the processor 120 may display the user interface 801 in the display area having the second size changed from the first size, such as the state 840 changed from the state 800 in response to the identification. For example, in the state 840, the user interface 801 may include the set 811 among the sets. For example, in the state 840, the user interface 801 may include the set 841, which is the set of the second information, together with the set 811. For example, the set 841 may include an executable object 842 for activating a microphone, coupled with the electric light, for receiving a user's voice command and an executable object 843 for deactivating the microphone. For example, the set 841 may be a set of information related to the set 811 and different from the sets 811 to 814. However, the disclosure is not limited thereto.

Figure 8B:
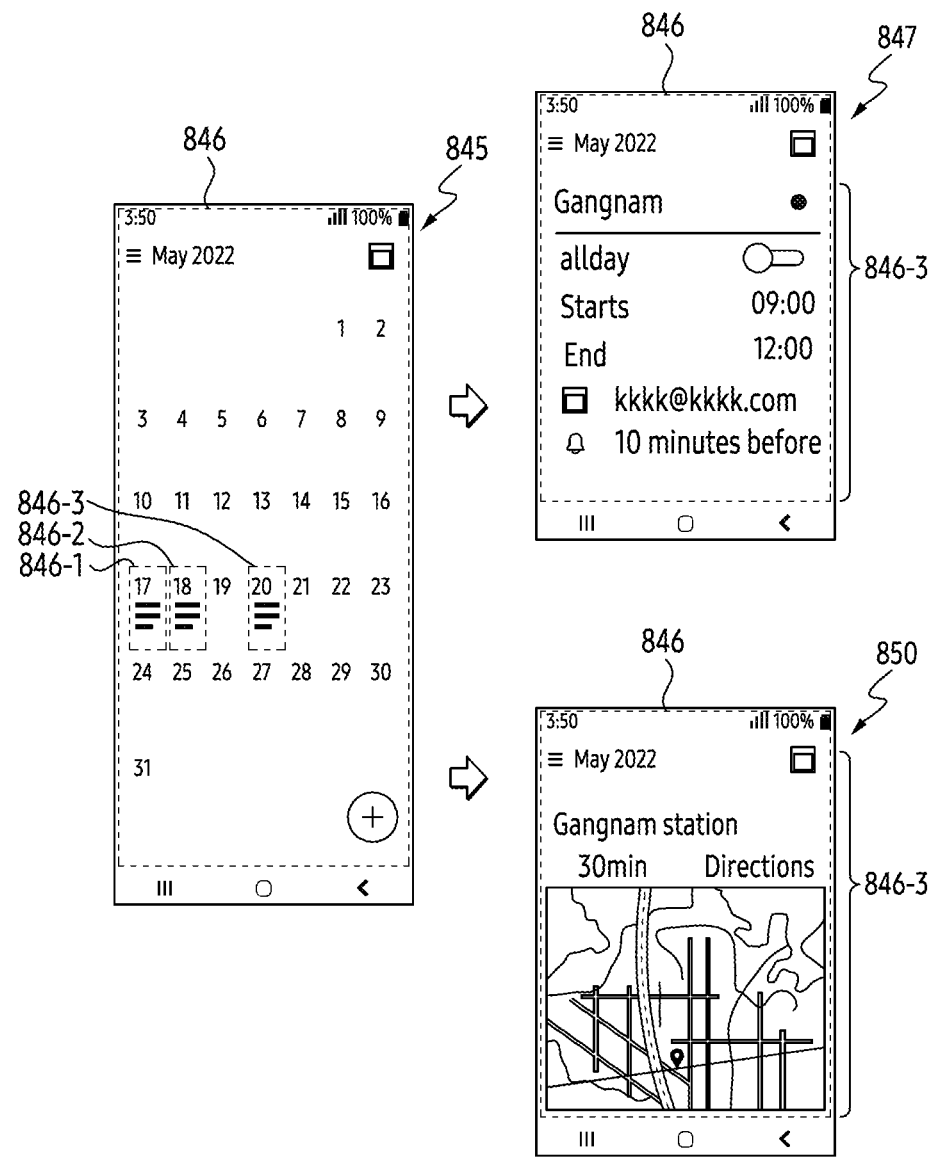

For example, referring to FIG. 8B, the processor 120 may display a user interface 846 in the display area having the first size, such as state 845. For example, the user interface 846 may be displayed based on execution of a software application for schedule management. For example, the user interface 846 may include the sets including a set 846-1, a set 846-2, and a set 846-3. For example, the set 846-1 among the sets may provide information related to at least one first schedule registered in the software application for a first date (e.g., May 17, 2022), the set 846-2 among the sets may provide information related to at least one second schedule registered in the software application for a second date (e.g., May 18, 2022), and the set 846-3 among the sets may provide information related to at least one third schedule registered in the software application for a third date (e.g., May 20, 2022). the set 846-3 may provide information related to at least one third schedule registered in the software application for a third date (e.g., May 20, 2022). However, the disclosure is not limited thereto.

For example, the processor 120 may receive a user input for changing the size of the display area to the second size in the state 845.

For example, the user input may be received on the third date (e.g., May 20, 2022) or on a fourth date (e.g., May 19, 2022) between the second date (May 18, 2022) and the third date (e.g., May 20, 2022). The processor 120 may change the state 845 to the state 847 or the state 850 in response to the user input. For example, in response to the user input, the processor 120 may identify the set 846-3 among the sets including the set 846-1, the set 846-2, and the set 846-3 as the set of first information. For example, the processor 120 may identify the set 846-3 related to the third date, which is the closest date from the fourth date, among the sets including the sets 846-1 to 846-3 as the set with the highest priority, based on identifying the context information of the user that indicates the user input indicating either the third date or the fourth date. However, the disclosure is not limited thereto.

For example, the processor 120 may display the user interface 846 in the display area having the second size changed from the first size, such as the state 847 changed from the state 800. For example, in the state 847, the user interface 846 may include the set 846-3 among the sets. For example, in the state 847, the user interface 846 may include the set 846-3 that provides more detailed information than the set 846-3 included in the user interface 846 in the state 845. For example, the set 846-3 included in the user interface 846 of the state 847 may further include time information of the at least one third schedule (e.g., 6 p.m. to 10 p.m. on May 20, 2022). For example, the set 846-3 included in the user interface 846 of the state 847 may further include information on the user account used to register the at least one third schedule (e.g., kkkk@kkkk.com). For example, the set 846-3 included in the user interface 846 of the state 847 may further include information on when notifications for reminders of the at least one third schedule are provided (e.g., 10 minutes ago). However, the disclosure is not limited thereto.

For example, the processor 120 may display the user interface 846 in the display area having the second size changed from the first size, such as the state 850 changed from the state 800. For example, in the state 850, the user interface 846 may include the set 846-3 among the sets. For example, in the state 850, the user interface 846 may include the set 846-3 that provides more detailed information than the set 846-3 included in the user interface 846 in the state 845. For example, the set 846-3 included in the user interface 846 of the state 850 may further include location information (e.g., Gangnam Station) of the at least one third schedule. For example, the set 846-3 included in the user interface 846 of the state 850 may further include an electronic map for displaying a path to the place of the at least one third schedule. However, the disclosure is not limited thereto.

Figure 8C:
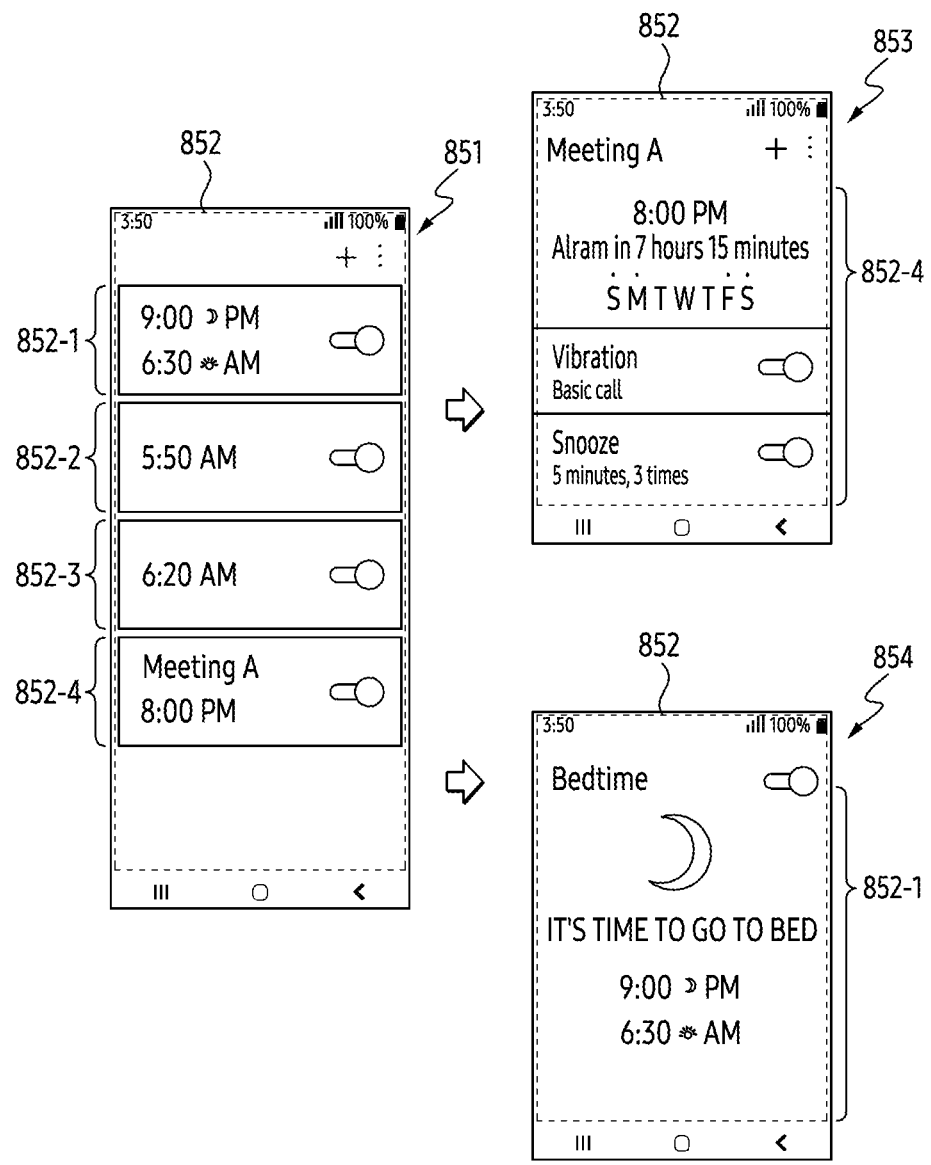

For example, referring to FIG. 8C, the processor 120 may display the user interface 852 in the display area having the first size, such as the state 851. For example, the user interface 852 may be displayed based on execution of a software application for an alarm. For example, the user interface 852 may include the sets including sets 852-1 to 852-4. For example, the set 852-1 among the sets may provide information on a first alarm (e.g., an alarm related to the target bedtime PM 9:00 to AM 6:30) registered in the software application, the set 852-2 among the sets may provide information on a second alarm (e.g., an alarm related to AM 5:50) registered in the software application, the set 852-3 may provide information on a third alarm (e.g., an alarm related to AM 6:20) registered in the software application, and the set 852-4 may provide information on a fourth alarm (e.g., an alarm related to PM 8:00) registered in the software application. However, the disclosure is not limited thereto.

For example, the processor 120 may receive a user input for changing the size of the display area to the second size in the state 851.

For example, the user input may be received before 8 p.m. on Sunday, Monday, Friday, or Saturday. For example, the processor 120 may change the state 851 to the state 853 in response to the user input. For example, the processor 120 may identify the set 852-4 among the sets 852-1 to 852-4 as the set of the first information in response to the user input. For example, the processor 120 may identify the set 852-4 among the sets as a set having the highest priority, based on identifying that the user's context information indicates that the user input is related to the fourth alarm provided through the set 852-4.

For example, such as the state 853 changed from the state 851, the processor 120 may display the user interface 852 in the display area having the second size changed from the first size. For example, in the state 853, the user interface 852 may include the set 852-4, which provides more detailed information than the set 852-4 included in the user interface 852 in the state 851. For example, the set 852-4 included in the user interface 852 of the state 853 may further include information indicating the type of alarm to be provided at 8 p.m. For example, the set 852-4 included in the user interface 852 of the state 853 may further include information indicating the functionality for snooze of alarms to be provided at 8 p.m. However, the disclosure is not limited thereto.

For example, the user input may be received before 9 p.m. on Sunday, Monday, Friday, or Saturday. For example, the processor 120 may change the state 851 to the state 854 in response to the user input. For example, the processor 120 may identify the set 852-1 among the sets 852-1 to 852-4 as the set of the first information in response to the user input. For example, the processor 120 may identify the set 852-1 among the sets as a set having the highest priority based on identifying that the user's context information indicates that the user input is related to the first alarm provided through the set 852-1.

For example, such as the state 854 changed from the state 851, the processor 120 may display the user interface 852 in the display area having the second size changed from the first size. For example, in the state 854, the user interface 852 may include the set 852-1 that provides more guide information than the set 852-1 included in the user interface 852 in the state 851. For example, the set 852-1 included in the user interface 852 of the state 854 may further include information that guides the recommended user behavior (e.g., "It's time to go to bed"). However, the disclosure is not limited thereto.

Figure 8D:
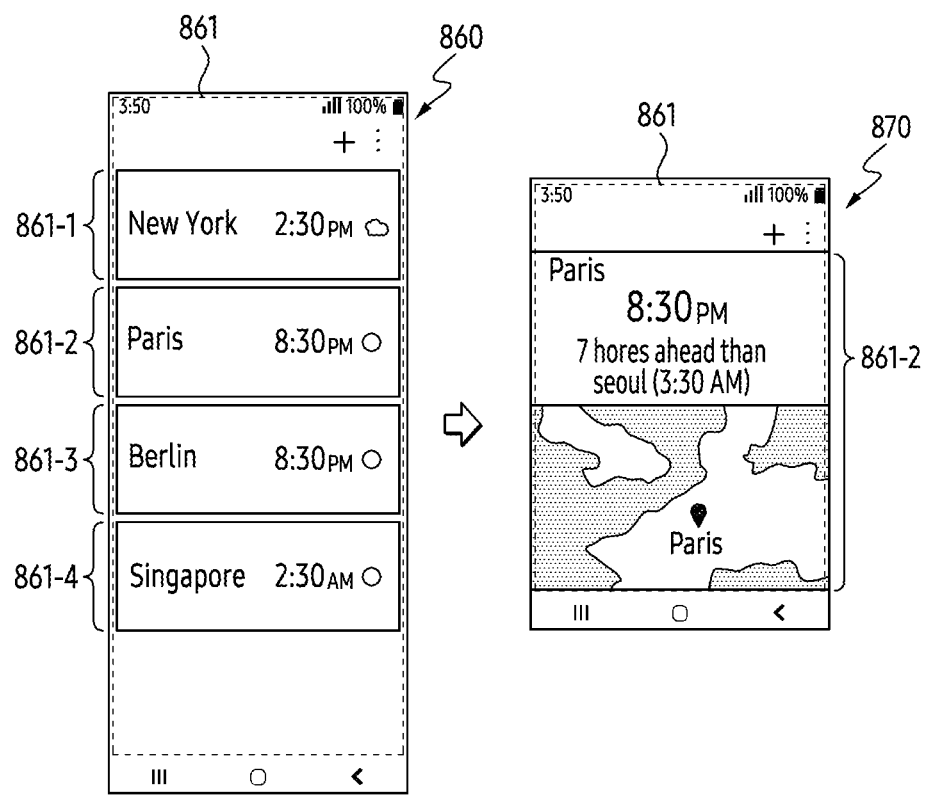

For example, referring to FIG. 8D, the processor 120 may display the user interface 861 in the display area having the first size, such as the state 860. For example, the user interface 861 may be displayed based on the execution of a software application for providing local time information. For example, the user interface 861 may include the sets including sets 861-1 to 861-4. For example, a set 861-1 among the sets may provide local time information of a first region (e.g., New York), a set 861-2 among the sets may provide local time information of a second region (e.g., Paris), a set 861-3 among the sets may provide local time information of a third region (e.g., Berlin), and a set 861-4 among the sets may provide local time information of a fourth region (e.g., Singapore). However, the disclosure is not limited thereto.

For example, the processor 120 may receive a user input for changing the size of the display area to the second size in state 860.

For example, the user input may be received while the electronic device 100 is located in Paris. The processor 120 may change the state 860 to the state 870 in response to the user input. For example, the processor 120 may identify the location of the electronic device 101 in response to the user input, and may identify the set 861-2 corresponding to the location among the sets including the sets 861-1 to 861-4 as the set of first information. For example, the processor 120 may identify the set 861-2 related to the second region among the sets including the sets 861-1 to 861-4, as the set with the highest priority based on identifying that the context information of the electronic device 101 indicates that the identified position of the electronic device 101 is related to the second region. For example, the set 861-2 may further include information including a visual object indicating the location of the electronic device 101 on an electronic map including the second region. However, the disclosure is not limited thereto.

As described above, while a user interface including sets of information is displayed in the display area having the first size, the electronic device 101 may obtain the context information of the electronic device 101 and the context information of the user. In response to the user input for changing the first size of the display area to the second size smaller than the first size while the user interface including the sets is displayed, the electronic device 101 may identify one set (e.g., the set of first information) corresponding to the context information of the electronic device and the context information of the user among the sets. The electronic device 101 may display the user interface including the identified set among the sets after the size of the display area is changed from the first size to the second size. For example, since the space provided through the display area of the second size is narrower than the space provided through the display area of the first size, the electronic device 101 may include the identified set in the user interface displayed in the display area having the second size, and may exclude the remaining sets from the user interface displayed in the display area having the second size. For example, in response to a change in the display area from the first size to the second size, the electronic device 101 may display only the set identified among the sets in the user interface so that a user experience when providing the display area having the first size and a user experience when providing the display area having the second size may be different from each other. For example, the electronic device 101 may display a new set (e.g., the set of second information) related to the identified set and distinguished from the set, in order to enhance the user experience when providing the display area having the second size, together with the identified set.

Figure 9A:
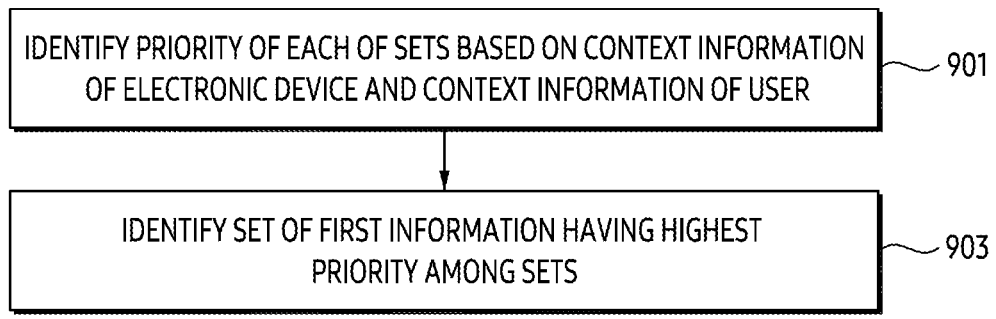
FIG. 9A illustrates an exemplary method of identifying priority of each of sets of information.

FIG. 9A illustrates an exemplary method of identifying priority of each of sets of information. This method may be executed by the electronic device 101 or the processor 120 of the electronic device 101 illustrated in FIG. 1.

Operation 901 and operation 903 of FIG. 9A may be included in operation 305 of FIG. 3.

Referring to FIG. 9A, in operation 901, the processor 120 may identify priority of each of the sets in the user interface based on the context information of the electronic device 101 and the context information of the user of the electronic device 101. For example, the processor 120 may identify the first weight of the context information of the electronic device 101 and the second weight of the context information of the user before identifying the priority. For example, the first weight and the second weight may be identified based on the past execution history of the electronic device 101 or the past use history of the electronic device 101 of the user. For example, the first weight and the second weight may be identified based on the location of the electronic device 101. For example, the first weight and the second weight may be identified based on the type of software applications executing in the electronic device 101. For example, the first weight and the second weight may be identified based on the type of service (or type of function) provided through the electronic device 101. However, the disclosure is not limited thereto.

The processor 120 may apply the first weight to the context information of the electronic device 101 and apply the second weight to the context information of the user, and then may identify the priority based on the context information of the electronic device 101 to which the first weight is applied and the context information of the user to which the second weight is applied. However, the disclosure is not limited thereto.

In operation 903, the processor 120 may identify the set of the first information having the highest priority among the sets. For example, the processor 120 may inquire the priority of each of the sets in response to the user input for changing the size of the display area from the first size to the second size, and identify the set of the first information having the highest priority based on the result of the inquiry.

As described above, when the size of the display area is changed to the second size smaller than the first size, the electronic device 101 may identify priority of each of the sets based on the context information of the electronic device 101 and the context information of the user in order to provide information suitable for the situation. For example, the electronic device 101 may provide an enhanced user experience by identifying the information to be displayed while the display area has the second size based on situational awareness.

Figure 9B:
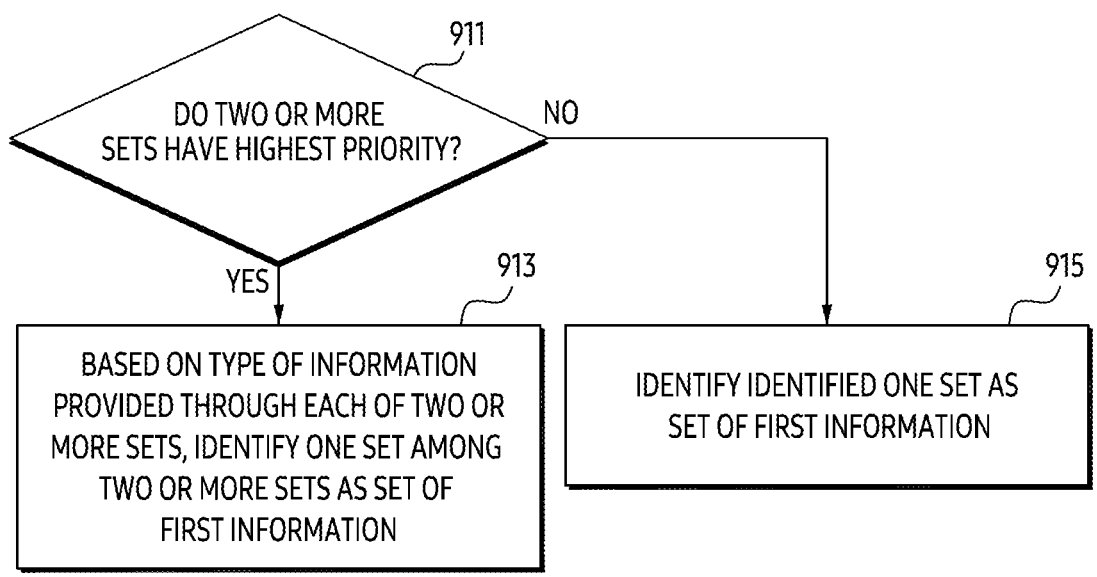
FIG. 9B illustrates an exemplary method of identifying a set of first information when priority of sets of information collide.

FIG. 9B illustrates an exemplary method of identifying a set of first information when priority of sets of information collide. This method may be executed by the electronic device 101 illustrated in FIG. 1 or the processor 120 of the electronic device 101.

Operations 911 to 915 of FIG. 9B may be included in operation 903 of FIG. 3.

Referring to FIG. 9B, in operation 911, the processor 120 may identify whether two or more sets of information have the highest priority based on the execution of operation 901. For example, since the set of the first information is a single set, the processor 120 may identify whether two or more sets of information have the highest priority. For example, the processor 120 may execute operation 913 under a condition that two or more sets have the highest priority (YES in operation 911), and may execute operation 915 under a condition that a single set has the highest priority (NO in operation 911).

In operation 913, based on the type of information provided through each of the two or more sets, the processor 120 may identify one set among two or more sets as the set of the first information. For example, the processor 120 may execute operation 913 in response to identifying that two or more sets have the highest priority.

For example, the processor 120 may identify whether the two or more sets include a set for providing information indicating that the condition of the user's body is a predetermined state. For example, the processor 120 may identify whether a set for providing information indicating that the users body condition is an emergency condition is included in the two or more sets. For example, the processor 120 may identify the set for providing the information as the set of first information based on identifying that the set for providing the information is included in the two or more sets. For example, the processor 120 may identify whether the two or more sets include a set related to a location corresponding to a users location, based on identifying that the set for providing the information is not included in the two or more sets.

For example, the processor 120 may identify the location of the electronic device 101 based on identifying that a set for providing information indicating that the state of the user's body is a predetermined state is not included in the two or more sets. The processor 120 may identify whether a set related to a location (or geographic area) corresponding to the identified location is included in the two or more sets. For example, the processor 120 may identify the set related to the identified location as the set of first information based on identifying that the set related to the identified location is included.

For example, the processor 120 may identify the set of the first information among the two or more sets by identifying a set for providing a function with a predetermined (e.g., specified) reference (or pattern) within the two or more sets, based on identifying that the set related to the identified location is not included. For example, the predetermined reference may be identified based on a past use history of the electronic device 101. For example, the predetermined reference may be identified based on an execution state of at least one software application related to the two or more sets. For example, the predetermined reference may be identified based on a state of updating frame data related to the two or more sets. However, the disclosure is not limited thereto. The processor 120 may identify the set for providing the function having the predetermined reference as the set of the first information, on a condition that all of the two or more sets are not related to the state of the user's body and the location of the user.

In operation 915, the processor 120 may identify the identified set as the set of the first information. For example, the processor 120 may identify a single set as the set of first information in response to identifying that the single set has the highest priority.

As described above, when the priority of the sets of information collide, the electronic device 101 may identify the set of first information based on the type of information provided from each of the sets. The electronic device 101 may provide a service corresponding to the situation through such identification.

Figure 10:
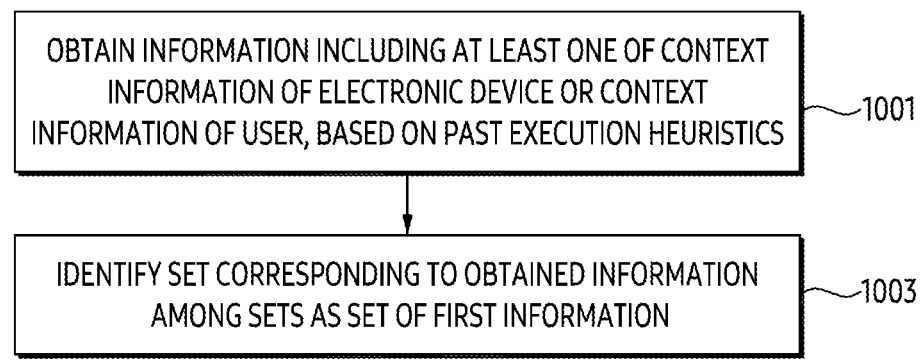
FIG. 10 illustrates an exemplary method of obtaining information used to identify a set of first information based on past execution heuristics.

FIG. 10 illustrates an exemplary method of obtaining information used to identify a set of first information based on past execution heuristics. This method may be executed by the electronic device 101 or the processor 120 of the electronic device 101 illustrated in FIG. 1.

Operations 1001 to 1003 of FIG. 10 may be included in operation 305 of FIG. 3.

Figure 11:
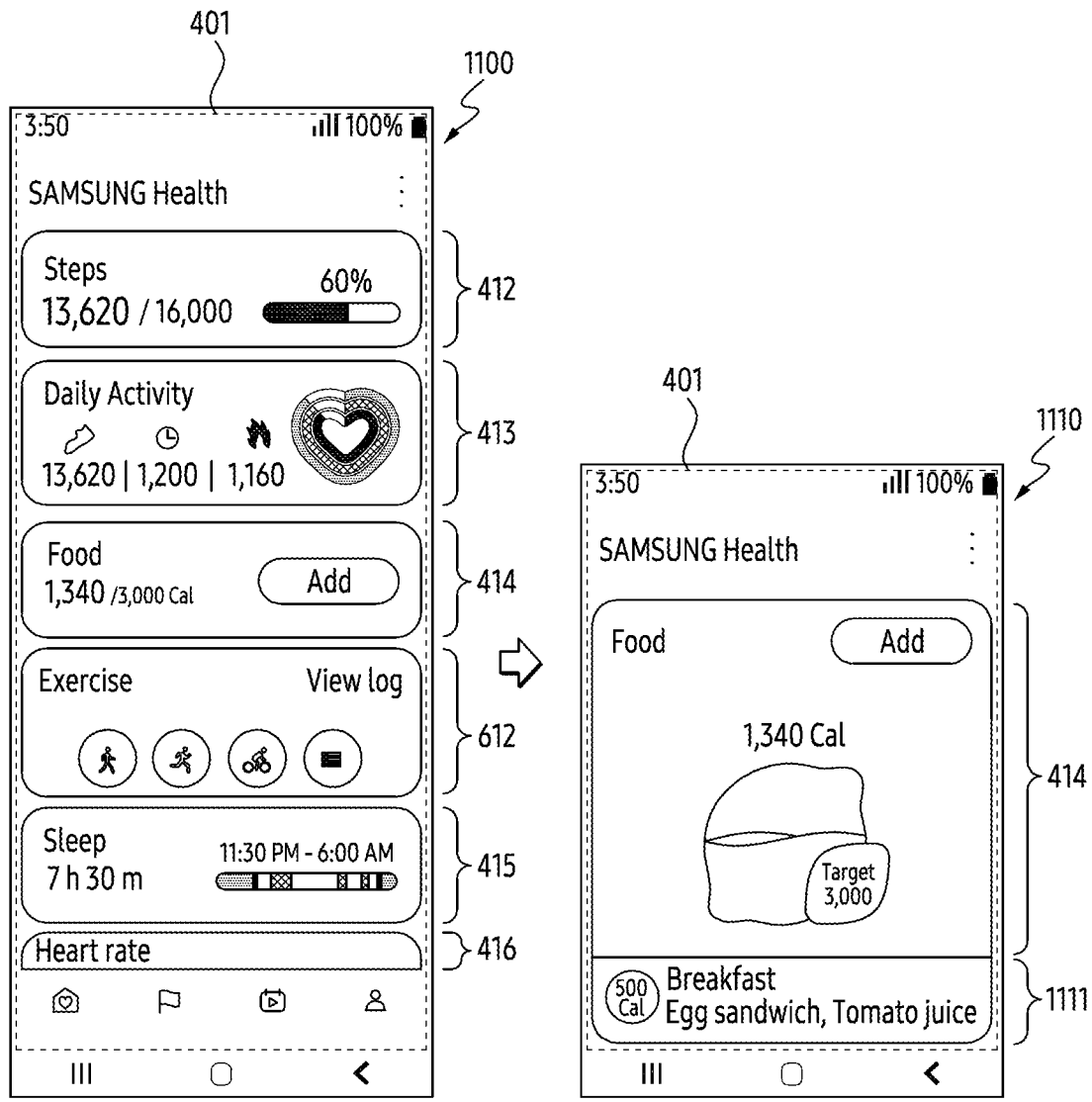
FIGS. 11 and 12 illustrate an example of a set of first information identified based on information obtained based on past execution heuristics.
Figure 12:
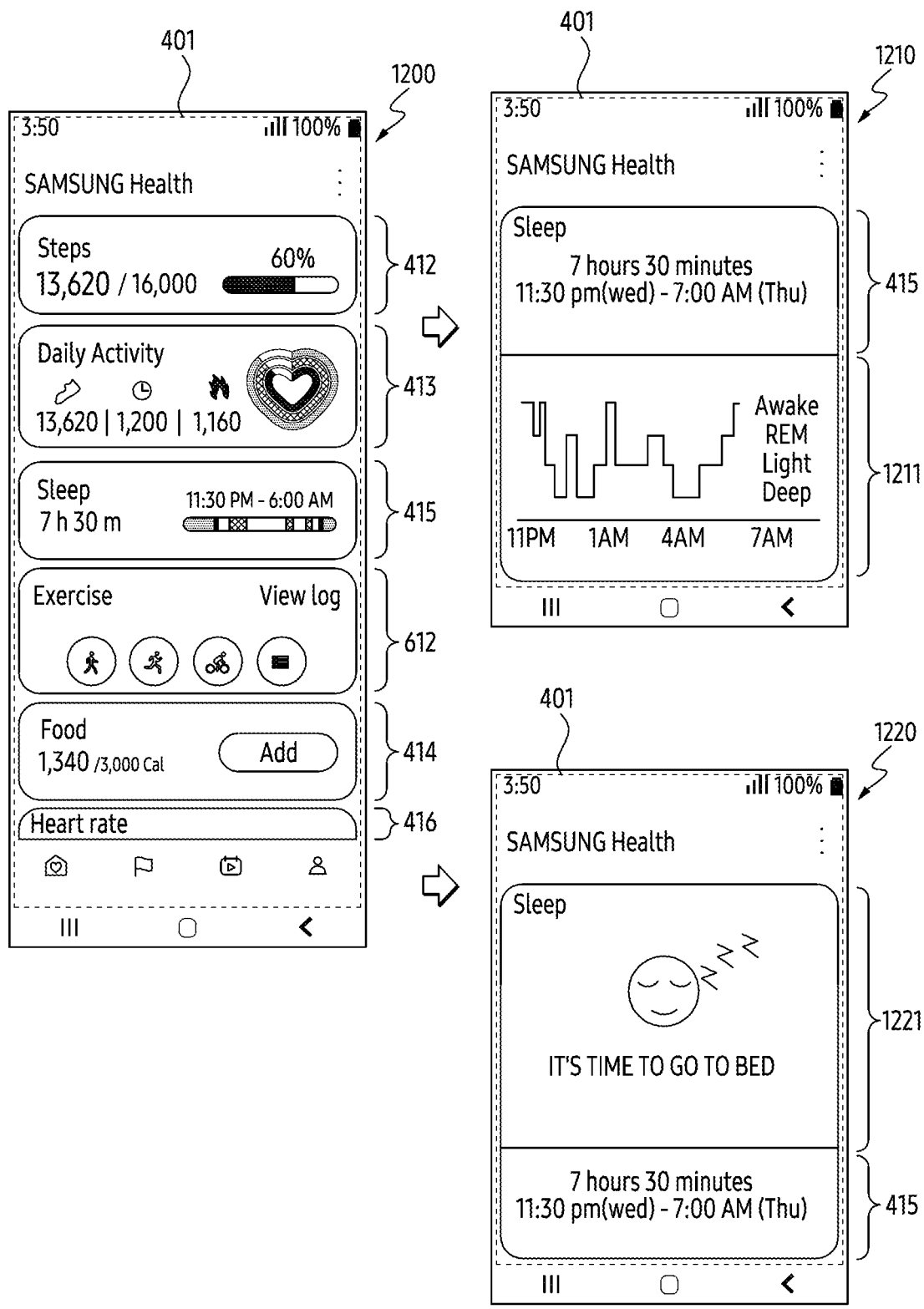

FIGS. 11 and 12 illustrate an example of a set of first information identified based on information obtained based on past execution heuristics.

Referring to FIG. 10, in operation 1001, in response to the user input for changing the size of the display area from the first size to the second size, the processor 120 may obtain information including at least one of the context information of the electronic device 101 or the context information of the user, based on past execution heuristics including the user's use history of the electronic device 101 stored in the electronic device 101.

For example, the past execution heuristic may be obtained based on the use of the electronic device 101 and/or the input of data to the electronic device 101. For example, the past execution heuristic may include at least one of information on the past execution pattern of the electronic device 101 or information on the past action pattern of the user. For example, the past execution heuristics may include information on what function was most frequently executed when the electronic device 101 was located within location A and/or information on what function was executed in the electronic device 101 at a first time of the day. However, the disclosure is not limited thereto.

For example, the processor 120 may obtain the information based on the past execution heuristics as well as the information of the electronic device 101 and the information of the user obtained, when the user input is received, through the sensor of the electronic device 101, in order to identify the action pattern of the electronic device 101 and the user as a set of the first information.

In operation 1003, the processor 120 may identify a set corresponding to the obtained information among the sets included in the user interface as the set of first information. For example, the processor 120 may identify the set of the first information based on the context information of the electronic device 101 identified when the user input is received, the context information of the user identified when the user input is received, the context information of the electronic device 101 obtained based on the past execution heuristics, and the context information of the user obtained based on the past execution heuristics.

For example, referring to FIG. 11, as in the state 1100, while displaying the user interface 401 including the set 412, the set 413, the set 414, the set 415, the set 416, and the set 612 within the display area having the first size, the processor 120 may receive the user input for changing the first size of the display area to the second size. In response to the user input, the processor 120 may identify the context information of the user indicating that the current time is within a predetermined time interval from the time the user usually finishes eating based on the information obtained based on the past execution heuristics. Based on the identification, the processor 120 may identify the set 414 among the set 412, the set 413, the set 414, the set 415, the set 416, and the set 612 as the set of the first information. For example, as in the state 1110 changed from the state 1100 in response to the user input, the processor 120 may display the user interface 401 including the set 414 and the set 1111. For example, in the state 1110, the set 1111 may be the set of the second information. For example, the set 1111 may provide information on the user's meal history input before the user input is received. For example, the set 1111 may provide other information that is distinct from the information provided through the set 412, the set 413, the set 414, the set 415, the set 416, and the set 612, and provide other information for assisting information provided through the set 414. However, the disclosure is not limited thereto.

For example, the representation of the set 414 in the state 1110 may be different from the representation of the set 414 in the state 1100. For example, since the set 414 in the state 1110 is provided within a larger space than the set 414 in the state 1100, the set 414 in the state 1110 may further include a visual object not included in the set 414 in the state 110. However, the disclosure is not limited thereto.

For another example, referring to FIG. 12, as shown in the state 1100, the processor 120 may receive the user input for changing the first size of the display area to the second size while displaying the user interface 401 including the set 412, the set 413, the set 414, the set 415, the set 416, and the set 612 within the display area having the first size. In response to the user input, the processor 120 may identify the context information of the user indicating that the current time is the time the user normally sleeps or that the user's target sleep time, based on the information obtained based on the past execution heuristics. Based on the identification, the processor 120 may identify the set 415 among the set 412, the set 413, the set 414, the set 415, the set 416, and the set 612 as the set of the first information.

For example, the processor 120 may display the user interface 401 including the set 415 and the set 1211, such as the state 1210 changed from the state 1200 in response to the user input. For example, in the state 1210, the set 1211 may be the set of the second information. For example, the set 1211 may provide information on the user's sleep pattern identified before the user input is received. For example, the set 1211 may provide other information that is distinct from the information provided through the set 412, the set 413, the set 414, the set 41, the set 416, and the set 612, and may provide other information for assisting the information provided through the set 415. However, the disclosure is not limited thereto.

As another example, the processor 120 may display the user interface 401 including the set 415 and a set 1221 in response to the user input, such as a state 1220 changed from the state 1200. For example, in the state 1220, the set 1221 may be the set of the second information. For example, the set 1221 may provide a notification for guiding the user's sleep. For example, the set 1221 may provide other information that is distinct from the information provided through the set 412, the set 413, the set 414, the set 415, the set 416, and the set 612, and may provide other information to assist the information provided through the set 415. However, the disclosure is not limited thereto.

As described above, the electronic device 101 may identify the set of the first information among the sets using the context information of the electronic device 101 identified based on the past execution history and the context information of the user identified based on the past execution history, as well as the context information of the electronic device 101 when the user input is received and the context information of the user when the user input is received. For example, the electronic device 101 may provide a service according to a change in the size of the display area based on enhanced situation recognition.

FIG. 13A is a front view of a first state of an electronic device according to an embodiment. FIG. 13B is a rear view of a first state of an electronic device according to an embodiment. FIG. 13C is a front view of a second state of an electronic device according to an embodiment. FIG. 13D is a rear view of a second state of the electronic device according to an embodiment.

Referring to FIGS. 13A, 13B, 13C, and 13D, the electronic device 1300 (e.g., electronic device 101 of FIG. 1) according to an embodiment may include a first housing 1310, a second housing 1320, a display 1330 (e.g., display 140 of FIG. 1), and a camera 1340. According to an embodiment, the second housing 1320 may be slidable with respect to the first housing 1310. For example, the second housing 1320 may move in a range within a preset distance along a first direction (e.g., +y direction) with respect to the first housing 1310. When the second housing 1320 moves along the first direction, a distance between the side surface 1320a of the second housing 1320 facing the first direction and the first housing 1310 may increase. For another example, the second housing 1320 may move in a range within a preset distance along a second direction (e.g., −y direction) opposite to the first direction with respect to the first housing 1310. When the second housing 1320 moves along the second direction, a distance between the side surface 1320a of the second housing 1320 facing the first direction and the first housing 1310 may be reduced. According to an embodiment, the second housing 1320 may linearly reciprocate with respect to the first housing 1310 by relatively sliding with respect to the first housing 1310. For example, at least a portion of the second housing 1320 may be insertable into the first housing 1310 or may be extractable from the first housing 1310.

According to an embodiment, the electronic device 1300 may be referred to as a "slidable electronic device" as the second housing 1320 is designed to be slidable with respect to the first housing 1310. According to an embodiment, the electronic device 1300 may be referred to as a "rollable electronic device" as at least a portion of the display 1330 is designed to be wound inside the second housing 1320 (or the first housing 1310) based on the slide movement of the second housing 1320.

According to an embodiment, the first state of the electronic device 1300 may refer, for example, to a state in which the second housing 1320 moves in the second direction (e.g., a contracted state or the slide-in state). For example, in the first state of the electronic device 1300, The second housing 1320 may be movable in the first direction, but may not be movable in the second direction. In the first state of the electronic device 1300, the distance between the side surface 1320a of the second housing 1320 and the first housing 1310 may increase as the second housing 1320 moves, but may be not reduced. For another example, in the first state of the electronic device 1300, a portion of the second housing 1320 may not be insertable. According to an embodiment, the first state of the electronic device 1300 may be slid into the first housing 1310, but may be a state in which the second area 1330b of the display 1330 is not visually exposed (e.g., visible or viewable) outside of the electronic device 1300. For example, in the first state of the electronic device 1300, the second area 1330b of the display 1330 may be located inside the internal space (not illustrated) of the electronic device 1300 formed by the first housing 1310 and/or the second housing 1320, and may not be visible outside of the electronic device 1300.

According to an embodiment, the second state of the electronic device 1300 may be defined as a state in which the second housing 1320 has moved in the first direction (e.g., an extract state or the slide-out state). For example, in the second state of the electronic device 1300, the second housing 1320 may be movable in the second direction, but may not be movable in the first direction. In the second state of the electronic device 1300, the distance between the side surface 1320a of the second housing 1320 and the first housing 1310 may be reduced as the second housing 1320 moves, but may not increase. For another example, in the second state of the electronic device 1300, a portion of the second housing 1320 may be slid into the first housing 1310, but may not be extractable from the first housing 1310. According to an embodiment, the second state of the electronic device 1300 may be a state in which the second area 1330b of the display 1330 is visually exposed from the outside of the electronic device 1300. For example, in the second state of the electronic device 1300, the second area 1330b of the display 1330 may be extracted from the internal space of the electronic device 1300 and may be visible from the outside of the electronic device 1300.

According to an embodiment, in case that the second housing 1320 moves in the first direction from the first housing 1310, at least a portion of the second housing 1320 and/or the second area 1330b of the display 1330 may be extracted from the first housing 1310 by an extract length d1 corresponding to the moving distance of the second housing 1320. According to an embodiment, the second housing 1320 may reciprocate within a preset distance d2. According to an embodiment, the extract length d1 may have a size of approximately 0 to the preset distance d2.

According to on embodiment, the state of the electronic device 1300 may be convertible between the second state and/or the first state by the manual operation by the user, or by the automatic operation by a driving module (not shown) disposed inside the first housing 1310 or the second housing 1320. According to an embodiment, the driving module may trigger an operation based on a user input. According to an embodiment, a user input for triggering an operation of the driving module may include a touch input through the display 1330, a force touch input, and/or a gesture input. According to an embodiment, a user input for triggering an operation of the driving module may include an audio input (voice input) or an input of a physical button exposed to the outside of the first housing 1310 or the second housing 1320. According to an embodiment, the driving module may be driven in a semi-automatic manner, in which an operation is triggered when a manual operation due to an external force of the user is detected.

According to an embodiment, the first state of the electronic device 1300 may be referred to as a first shape, and the second state of the electronic device 1300 may be referred to as a second shape. For example, the first shape may include a normal state, a reduced state, or a closed state, and the second shape may include an open state. According to an embodiment, the electronic device 1300 may form a third state (e.g., an intermediate state) that is a state between the first state and the second state. For example, the third state may be referred to as a third shape, and the third shape may include a free stop state.

According to an embodiment, the display 1330 may be visible (or viewable) from the outside through the front direction (e.g., −z direction) of the electronic device 1300 so that visual information may be displayed to the user. For example, the display 1330 may include a flexible display. According to an embodiment, at least a portion of the display 1330 may be disposed in the second housing 1320, and may be extracted from an internal space (not illustrated) of the electronic device 1300 or may be inserted into the internal space of the electronic device 1300 according to the movement of the second housing 1320. The internal space of the electronic device 1300 may refer to a space in the first housing 1310 and the second housing 1320 formed by the combination of the first housing 1310 and the second housing 1320. For example, in the first state of the electronic device 1300, at least a portion of the display 1330 may be rolled into an internal space of the electronic device 1300 and inserted therein. In a state where at least a portion of the display 1330 is inserted into the internal space of the electronic device 1300, when the second housing 1320 moves in the first direction, at least a portion of the display 1330 may be extracted from the internal space of the electronic device 1300. For another example, when the second housing 1320 moves in the second direction, at least a portion of the display 1330 is rolled into the electronic device 1300, so that it may be inserted into the internal space of the electronic device 1300. As at least a portion of the display 1330 is extracted or inserted, the area of the display 1330 visible from the outside of the electronic device 1300 may be expanded or reduced. According to an embodiment, the display 1330 may include a first area 1330a and/or a second area 1330b.

According to an embodiment, the first area 1330a of the display 1330 may refer to an area of the display 1330 that may be fixedly visible from the outside of the electronic device 1300 regardless of whether the electronic device 1300 is in the second state or the first state. For example, the first area 1330a may refer to a partial area of the display 1330 that is not rolled into the internal space of the electronic device 1300. According to an embodiment, when the second housing 1320 moves, the first area 1330a may move together with the second housing 1320. For example, when the second housing 1320 moves along the first direction or the second direction, the first area 1330a may move along the first direction or the second direction on the front surface of the electronic device 1300 together with the second housing 1320.

According to an embodiment, the second area 1330b of the display 1330 may be connected to the first area 1330a, and may be inserted into the internal space of the electronic device 1300 or may be extracted from the internal space of the electronic device 1300 to the outside as the second housing 1320 moves. For example, in the first state of the electronic device 1300, at least a portion of the second area 1330b of the display 1330 may be inserted into the internal space of the electronic device 1300, as the rolled state. In the first state of the electronic device 1300, the second area 1330b of the display 1330 is inserted into the internal space of the electronic device 1300 and may not be visible from the outside. For another example, the second area 1330b of the display 1330 may be in a state extracted from the internal space of the electronic device 1300 in the second state of the electronic device 1300. The second area 1330b of the display 1330 may be visible from the outside of the electronic device 1300 in the second state.

According to an embodiment, in the first state of the electronic device 1300, the area of the display 1330 visible from the outside of the electronic device 1300 may include only the first area 1330a of the display 1330. In the second state of the electronic device 1300, the area of the display 1330 visible from the outside of the electronic device 1300 may include at least a portion of the first area 1330a and the second area 1330b of the display 1330.

According to an embodiment, the first housing 1310 of the electronic device 1300 may include a book cover 1311 surrounding the internal space of the first housing 1310, a rear plate 1312 surrounding the rear surface of the book cover 1311, and a first side surface member 1314 surrounding at least a portion of an edge of the book cover 1311. According to an embodiment, the book cover 1311 may be integrally formed with the first side surface member 1314. The book cover 1311 may extend into the electronic device 1300 from at least a portion of one surface of the first side surface member 1314 facing the inside of the electronic device 1300. According to an embodiment, the book cover 1311 and the first side surface member 1314 may be integrally formed or made of the same material.

According to an embodiment, the front cover 1321 may include a first cover area 1321a of the front cover 1321, which is not inserted into the first housing 1310, and a second cover area 1321b that is inserted into or slid outside the first housing 1310. The first cover area 1321a of the front cover 1321 may always be visible regardless of whether the electronic device 1300 is in the second state or the first state. According to an embodiment, at least a part of the first cover area 1321a of the front cover 1321 may form a side surface 1320a of the second housing 1320. According to an embodiment, the second cover area 1321b of the second housing 1320 may not be visible in the first state but may be visible in the second state.

The camera 1340 may obtain an image of a subject based on receiving light from the outside of the electronic device 1300. According to an embodiment, the camera 1340 may include one or a plurality of lenses, an image sensor, and/or an image signal processor. According to an embodiment, the camera 1340 may be disposed in the second housing 1320 to face the rear surface of the electronic device 1300 opposite to the front surface of the electronic device 1300 in which the first area 1330a of the display 1330 is disposed. For example, the camera 1340 may be disposed in the front cover 1321 of the second housing 1320, and may be visible from the outside of the electronic device 1300 through the opening 1311a formed in the book cover 1311 when the electronic device 1300 is in the first state. For another example, the camera 1340 may be disposed in the front cover 1321 of the second housing 1320, and may not be visible from the outside of the electronic device 1300 because it is covered by the book cover 1311 and/or the rear surface plate 1312 when the electronic device 1300 is in the first state.

According to an embodiment, the camera 1340 may include a plurality of cameras. For example, the camera 1340 may include a wide-angle camera, an ultra-wide-angle camera, a telephoto camera, a proximity camera, and/or a depth camera. However, the camera 1340 is not necessarily limited to including a plurality of cameras, and may include one camera.

According to an embodiment, the camera 1340 may further include a camera (not illustrated) facing the front surface of the electronic device 1300 on which the first area 1330a of the display 1330 is disposed. In case that the camera 1340 faces the front surface of the electronic device 1300, the camera 1340 may be an under display camera (UDC) disposed under the display 1330 (e.g., +z direction from the display 1330), but is not limited thereto.

According to an embodiment, the electronic device 1300 may include a sensor module (not illustrated) and/or a camera module (not illustrated) disposed under the display 1330. The sensor module may detect an external environment based on information (e.g., light) received through the display 1330. According to an embodiment, the sensor module may include at least one of a receiver, a proximity sensor, an ultrasonic sensor, a gesture sensor, a gyro sensor, an air pressure sensor, a magnetic sensor, an acceleration sensor, a grip sensor, a color sensor, an IR (infrared) sensor, a biometric sensor, a temperature sensor, a humidity sensor, a motor encoder, or an indicator. According to an embodiment, at least some sensor modules of the electronic device 1300 may be visually exposed from the outside through a partial area of the display 1330. According to an embodiment, the electronic device 1300 may detect an extract length (e.g., length d1) using a sensor module. According to an embodiment, the electronic device 1300 may generate extract information on an extracted degree sensed by the sensor. For example, the electronic device 1300 may sense and/or identify the extracted degree of the second housing 1320 using the extract information. For example, the electronic device 1300 may detect and/or identify the extracted degree of the second housing 1320 using the extract information. According to an embodiment, the extract information may include information on an extract length of the second housing 1320.

According to an embodiment, the coupling form of the first housing 1310 and the second housing 1320 is not limited to the shapes and coupling illustrated in FIGS. 13A, 13B, 13C, and 13D, and may be implemented by a combination and/or coupling of other shapes or components.

FIG. 14A is an exploded perspective view of an electronic device according to an embodiment, and FIG. 14B is a cross-sectional view illustrating an example in which an electronic device taken along A-A' of FIG. 13A according to various embodiments.

Referring to FIGS. 14A and 14B, an electronic device 1300 according to an embodiment may include a first housing 1310, a second housing 1320, a display 1330, a camera 1340, a battery 1350, and/or a driving unit 1360. According to an embodiment, the first housing 1310 and the second housing 1320 may be coupled to each other to form an internal space 1301 of the electronic device 1300. For example, in the first state of the electronic device 1300, the second area 1330b of the display 1330 may be accommodated in the internal space 1301.

According to an embodiment, the first housing 1310 may include a book cover 1311, a rear plate 1312 and/or a frame cover 1313. According to an embodiment, the book cover 1311, the rear plate 1312, and the frame cover 1313 included in the first housing 1310 may be coupled to each other and may not move when the second housing 1320 moves with respect to the first housing 1310. According to an embodiment, the book cover 1311 may form at least a portion of an outer surface of the electronic device 1300. For example, the book cover 1311 may form at least a portion of the side surface of the electronic device 1300, and may form at least a portion of the rear surface of the electronic device 1300. According to an embodiment, the book cover 1311 may provide a surface on which the rear plate 1312 is seated. The rear plate 1312 may be mounted on one surface of the book cover 1311.

According to an embodiment, the frame cover 1313 may support internal components of the electronic device 1300. For example, the frame cover 1313 may accommodate the battery 1350 and the motor 1361 of the driving unit 1360. The battery 1350 and the motor 1361 may be accommodated in at least one of recesses or holes included in the frame cover 1313. According to an embodiment, the frame cover 1313 may be surrounded by the book cover 1311. For example, in the first state of the electronic device 1300, one surface 1313a of the frame cover 1313 on which the battery 1350 is disposed may face the book cover 1311 and/or the second area 1330b of the display 1330. For another example, in the first state of the electronic device 1300, the other surface 1313b of the frame cover 1313 facing the opposite direction to the one surface 1313a of the frame cover 1313 may face the first area 1330a of the display 1330 or the front cover 1321. For example, the frame cover 1313 may include aluminum as a material, but is not limited thereto.

According to an embodiment, the second housing 1320 may include a front cover 1321, a rear cover 1322, and/or a slide cover 1323. According to an embodiment, the front cover 1321, the rear cover 1322, and the slide cover 1323 may be coupled to each other and may move together with the second housing 1320 when the second housing 1320 relatively move with respect to the first housing 1310. The front cover 1321 may support internal components of the electronic device 1300. For example, the printed circuit board 1324 and/or the camera 1340 on which electronic components (e.g., processor 130 in FIG. 1) of the electronic device 1300 are disposed may be disposed on one surface 1321c of the front cover 1321 facing the internal space 1301. The other surface 1321d of the front cover 1321 facing in a direction opposite to the one surface 1321c of the front cover 1321 may face the first area 1330a of the display 1330 when the electronic device 1300 is in the first state. According to an embodiment, the rear cover 1322 may be coupled to the front cover 1321 to protect components of the electronic device 1300 disposed on the front cover 1321. For example, the rear cover 1322 may cover a portion of one surface 1321c of the front cover 1321. According to an embodiment, the slide cover 1323 may be disposed on the rear cover 1322 to form an outer surface of the electronic device 1300 together with the rear plate 1312 and the book cover 1311. The slide cover 1323 may be coupled to one surface of the rear cover 1322 or the front cover 1321 to protect the rear cover 1322 and/or the front cover 1321.

According to an embodiment, when the electronic device 1300 is in the first state, the display 1330 may be bent by at least partially being rolled into the internal space 1301. According to an embodiment, the display 1330 may cover at least a portion of the frame cover 1313, and at least a portion of the front cover 1321. For example, when the electronic device 1300 is in the first state, the display 1330 may cover the other surface 1321d of the front cover 1321, may pass between the front cover 1321 and the book cover 1311, and may extend toward the internal space 1301. At least a portion of the display 1330 may surround at least a portion of the frame cover 1313, after passing between the front cover 1321 and the book cover 1311. The display 1330 may cover one surface 1313a of the frame cover 1313 in the internal space 1301. According to an embodiment, when the second housing 1320 moves in the first direction, the second area 1330b of the display 1330 may be extracted from the internal space 1301. For example, as the second housing 1320 moves in the second direction, the display 1330 may pass between the front cover 1321 and the book cover 1311, and may be extracted from the internal space 1301.

According to an embodiment, the electronic device 1300 may include a support bar 1331 for supporting the display 1330 and a guide rail 1332. For example, the support bar 1331 may include a plurality of bars coupled to each other and may be manufactured in a shape corresponding to the shape of the second area 1330b of the display 1330. According to an embodiment, as the display 1330 moves, the support bar 1331 may move together with the display 1330. According to an embodiment, in the first state in which the second area 1330*b* of the display 1330 is wound in the internal space 1301, the support bar 1331 may be wound in the internal space 1301 together with the second area 1330*b* of the display 1330. As the second housing 1320 moves in the first direction, the support bar 1331 may move together with the second area 1330*b* of the display 1330. According to an embodiment, the guide rail 1332 may guide the movement of the support bar 1331. For example, as the display 1330 moves, the support bar 1331 may move along the guide rail 1332 coupled to the frame cover 1313. According to an embodiment, the guide rail 1332 may be coupled to the frame cover 1313 or the book cover 1311. For example, the guide rail 1332 may include a plurality of guide rails 1332 disposed to be spaced apart from each other at both edges of the frame cover 1313 spaced apart from each other along a third direction perpendicular to the first direction (e.g., +x direction).

According to an embodiment, the driving unit 1360 may provide a driving force to the second housing 1320 so that the second housing 1320 may relatively move with respect to the first housing 1310. According to an embodiment, the driving unit 1360 may include a motor 1361, a pinion gear 1362, and/or a rack gear 1363. The motor 1361 may receive power from the battery 1350 and may provide a driving force to the second housing 1320. According to an embodiment, the motor 1361 may be disposed in the first housing 1310 and not move when the second housing 1320 moves with respect to the first housing 1310. For example, the motor 1361 may be disposed in a recess formed in the frame cover 1313. According to an embodiment, the pinion gear 1362 is coupled to the motor 1361 and may rotate by a driving force provided from the motor 1361. According to an embodiment, the rack gear 1363 may engage with the pinion gear 1362, and may move according to rotation of the pinion gear 1362. For example, the rack gear 1363 may reciprocate linearly in the first direction or the second direction according to the rotation of the pinion gear 1362. According to an embodiment, the rack gear 1363 may be disposed in the second housing 1320. For example, the rack gear 1363 may be coupled to the front cover 1321 included in the second housing 1320. According to an embodiment, the rack gear 1363 may be movable inside the operating space 1313*p* formed in the frame cover 1313.

According to an embodiment, when the pinion gear 1362 rotates along the first rotation direction (e.g., clockwise direction in FIG. 14B), the rack gear 1363 may move in the first direction (e.g., +y direction). When the rack gear 1363 moves along the first direction, the second housing 1320 coupled to the rack gear 1363 may move along the first direction. As the second housing 1320 moves along the first direction, the area of the display 1330 visible from the outside of the electronic device 1300 may be expanded. When the pinion gear 1362 rotates along the second rotation direction (e.g., counterclockwise direction in FIG. 14B), the rack gear 1363 may move in the second direction (e.g., −y direction). When the rack gear 1363 moves along the second direction, the second housing 1320 coupled to the rack gear 1363 may move along the second direction. As the second housing 1320 moves along the second direction, the area of the display 1330 visible from the outside of the electronic device 1300 may be reduced.

In the above description, it has been described that the motor 1361 and the pinion gear 1362 are disposed in the first housing 1310, and the rack gear 1363 is disposed in the second housing 1320, but embodiments may not be limited thereto. According to embodiments, the motor 1361 and the pinion gear 1362 may be disposed in the second housing 1320 and the rack gear 1363 may be disposed in the first housing 1310.

An electronic device, a method, and a non-transitory computer-readable storage medium according to an embodiment can provide an enhanced user experience (UX) by identifying a set of information according to change in size of a display area.

According to an example embodiment, an electronic device may comprise: a housing, a flexible display capable of being slid into the housing and being slid out of the housing, a memory configured to store instructions, and a processor operably coupled with the flexible display. The processor may be configured to, when the instructions are executed, display a user interface including sets of information in a display area of the flexible display exposed out of the housing. The processor may be configured to, when the instructions are executed, receive an input for changing size of the display area from first size to second size smaller than the first size, while displaying the user interface including the sets of the information. The processor may be configured to, when the instructions are executed, identify a set of first information among the sets, based on at least one of context information of the electronic device or context information of a user of the electronic device, in response to the user input. The processor may be configured to, when the instructions are executed, display the user interface including the set of the first information and a set of second information that is different from the sets and is associated with the set of the first information in the display area with the second size changed from the first size and cease to display remaining sets among the sets in the user interface.

In an example embodiment, the processor may be configured to, when the instructions are executed identify priority of each of the sets, based on the context information of the electronic device and the context information of the user. In an embodiment, the processor may be configured to, when the instructions are executed identify the set of the first information with highest priority among the sets.

In an example embodiment, the context information of the electronic device may be identified based on at least one of data caused in the electronic device or data received from an external electronic device to the electronic device.

In an example embodiment, the context information of the user may be identified based on at least one of data that is obtained via a sensor of the electronic device and is associated with the user or data that is received from an external electronic device and is associated with the user.

In an example embodiment, the set of the first information may be a set that change of display is most frequently executed among the sets in the user interface displayed in the display area with the first size.

In an example embodiment, the set of the first information may be a set that change of display is most recently executed among the sets in the user interface displayed in the display area with the first size.

In an example embodiment, the set of the first information may be a set that includes data outside of reference range among the sets in the user interface displayed in the display area with the first size.

In an example embodiment, the set of the second information may be identified based on second data distinct from first data used for identifying the set of the first information.

In an example embodiment, the processor may be further configured to, when the instructions are executed, display the set of the second information extended from the set of the first information, while the size of the display area is changed from the first size to the second size.

In an example embodiment, the set of the first information and the set of the second information may be included in a single card displayed in the user interface displayed in the display area with the second size.

In an example embodiment, the processor may be further configured to, when the instructions are executed, receive a swipe input that a touch input contacted on the display area with the second size is moved and is released, while the user interface including the set of the first information and the set of the second information is displayed in the display area with the second size.

In an example embodiment, the processor may be further configured to, when the instructions are executed, in response to the swipe input, cease to display the set of the second information in the user interface in the display area with the second size and display at least a portion of the remaining sets with the set of the first information in the user interface in the display area with the second size.

In an example embodiment, the processor may be further configured to, when the instructions are executed, receive a touch input for zoom-in while the at least the portion of the remaining sets is displayed with the set of the first information in the user interface in the display area with the second size.

In an example embodiment, the processor may be further configured to, when the instructions are executed, in response to the touch input, cease to display the user interface including the at least the portion of the remaining sets with the set of the first information in the display area with the second size and resume to display the user interface including the set of the first information and the set of the second information in the display area with the second size.

In an example embodiment, the processor may be configured to, when the instructions are executed, identify, in response to the user input, a set visually highlighted among the sets as the set of the first information.

In an example embodiment, the processor may be configured to, when the instructions are executed, obtain information that includes at least one of the context information of the electronic device or the context information of the user, based on past execution heuristics including a use history of the electronic device of the user stored in the electronic device, in response to the input.

In an example embodiment, the processor may be configured to, when the instructions are executed, identify a set corresponding to the obtained information as the set of the first information.

In an embodiment, the processor may be configured to, when the instructions are executed, in response to the input, identify a set associated with a position of the electronic device among the sets as the set of the first information.

In an example embodiment, the processor may be configured to, when the instructions are executed, identify, in response to the user input, a set focused based on the input being received among the sets as the set of the first information.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a housing;
a flexible display capable of being slid into the housing and being slid out of the housing;
a memory configured to store instructions; and
a processor, operably coupled with the flexible display, the processor is configured to, when the instructions are executed:
display a user interface including sets of information in a display area of the flexible display exposed out of the housing;
receive a user input for changing size of the display area from first size to second size smaller than the first size, while displaying the user interface including the sets of the information;
identify a set of first information among the sets of information, based on at least one of context information of the electronic device or context information of a user of the electronic device, in response to the user input; and
after the display area is changed from the first size to the second size in response to the user input:
cease to display remaining sets except the set of the first information among the sets of the information to cause the remaining sets to disappear from the user interface; and
further display, in the user interface, a set of second information associated with the set of the first information alongside the set of the first information that is maintained in the user interface after the user input is received.

2. The electronic device of claim 1, wherein the processor is configured to, when the instructions are executed:
identify a priority of each of the sets of the information, based on the context information of the electronic device and the context information of the user; and
identify the set of the first information with a highest priority among the sets of the information.

3. The electronic device of claim 1, wherein the context information of the electronic device is identified based on at least one of data in the electronic device or data received from an external electronic device to the electronic device, and
wherein the context information of the user is identified based on at least one of data obtained via a sensor of the electronic device and associated with the user or data received from an external electronic device and associated with the user.

4. The electronic device of claim 1, wherein the set of the first information is a set that change of display is most frequently executed among the sets of the information in the user interface displayed in the display area with the first size.

5. The electronic device of claim 1, wherein the set of the first information is a set that change of display is most recently executed among the sets of the information in the user interface displayed in the display area with the first size.

6. The electronic device of claim 1, wherein the set of the first information is a set that includes data outside of reference range among the sets of the information in the user interface displayed in the display area with the first size.

7. The electronic device of claim 1, wherein the set of the second information is identified based on second data distinct from first data used for identifying the set of the first information.

8. The electronic device of claim 1, wherein the processor is further configured to, when the instructions are executed:
display the set of the second information being extended from the set of the first information, while the size of the display area is changed from the first size to the second size.

9. The electronic device of claim 8, wherein the set of the first information and the set of the second information are included in a single card displayed in the user interface displayed in the display area with the second size.

10. The electronic device of claim 1, wherein the processor is further configured to, when the instructions are executed:
receive a swipe input that a touch input contacted on the display area with the second size is moved and is released, while the user interface including the set of the first information and the set of the second information is displayed in the display area with the second size; and
in response to the swipe input, cease to display the set of the second information in the user interface in the display area with the second size and display at least a portion of the remaining sets with the set of the first information in the user interface in the display area with the second size.

11. The electronic device of claim 10, wherein the processor is further configured to, when the instructions are executed:
receive a touch input for zoom-in while the at least the portion of the remaining sets is displayed with the set of the first information in the user interface in the display area with the second size; and
in response to the touch input, cease to display the user interface including the at least the portion of the remaining sets with the set of the first information in the display area with the second size and resume to display the user interface including the set of the first information and the set of the second information in the display area with the second size.

12. The electronic device of claim 1, wherein the processor is configured to, when the instructions are executed:

identify, in response to the user input, a set visually highlighted among the sets of the information as the set of the first information.

13. The electronic device of claim 1, wherein the processor is configured to, when the instructions are executed:
   obtain information including at least one of the context information of the electronic device or the context information of the user, based on past execution heuristics including a use history of the electronic device of the user stored in the electronic device, in response to the user input; and
   identify a set corresponding to the obtained information as the set of the first information.

14. The electronic device of claim 1, wherein the processor is configured to, when the instructions are executed:
   in response to the user input, identify a set associated with a position of the electronic device among the sets of the information as the set of the first information.

15. The electronic device of claim 1, wherein the processor is configured to, when the instructions are executed:
   identify, in response to the user input, a set focused based on the user input being received among the sets of the information as the set of the first information.

16. A method for operating an electronic device including a housing and a flexible display capable of being slid into the housing and being slid out of the housing, the method comprising:
   displaying a user interface including sets of information in a display area of the flexible display exposed out of the housing;
   receiving a user input for changing size of the display area from first size to second size smaller than the first size, while displaying the user interface including the sets of the information;
   identifying a set of first information among the sets of the information, based on at least one of context information of the electronic device or context information of a user of the electronic device, in response to the user input; and
   after the display area is changed from the first size to the second size in response to the user input:
      ceasing to display remaining sets except the set of the first information among the sets of the information to cause the remaining sets to disappear from the user interface; and
      further displaying, in the user interface, a set of second information associated with the set of the first information alongside the set of the first information that is maintained in the user interface after the user input is received.

17. The method of claim 16, wherein identifying the set of the first information comprises:
   identifying a priority of each of the sets of the information, based on the context information of the electronic device and the context information of the user; and
   identifying the set of the first information with a highest priority among the sets of the information.

18. The method of claim 16, wherein the context information of the electronic device is identified based on at least one of data in the electronic device or data received from an external electronic device to the electronic device, and
   wherein the context information of the user is identified based on at least one of data obtained via a sensor of the electronic device and associated with the user or data received from an external electronic device and associated with the user.

19. The method of claim 16, wherein the set of the first information is a set that change of display is most frequently executed among the sets of the information in the user interface displayed in the display area with the first size.

20. The method of claim 16, wherein the set of the first information is a set that change of display is most recently executed among the sets of the information in the user interface displayed in the display area with the first size.

* * * * *